(12) United States Patent
Tanaka et al.

(10) Patent No.: US 11,110,613 B2
(45) Date of Patent: Sep. 7, 2021

(54) HOLDING MECHANISM, TRANSFER DEVICE, HANDLING ROBOT SYSTEM, AND ROBOT HANDLING METHOD

(71) Applicant: Kabushiki Kaisha Toshiba, Minato-ku (JP)

(72) Inventors: Junya Tanaka, Ota (JP); Atsushi Sugahara, Kawasaki (JP)

(73) Assignee: Kabushiki Kaisha Toshiba, Minato-ku (JP)

(*) Notice: Subject to any disclaimer, the term of this patent is extended or adjusted under 35 U.S.C. 154(b) by 0 days.

(21) Appl. No.: 16/861,694

(22) Filed: Apr. 29, 2020

(65) Prior Publication Data

US 2020/0254627 A1    Aug. 13, 2020

Related U.S. Application Data

(62) Division of application No. 15/684,997, filed on Aug. 24, 2017, now Pat. No. 10,744,653.

(30) Foreign Application Priority Data

Mar. 17, 2017    (JP) .............................. JP2017-053464

(51) Int. Cl.
  *B25J 15/02*    (2006.01)
  *B25J 13/08*    (2006.01)
  *B25J 19/02*    (2006.01)

(52) U.S. Cl.
  CPC ............. *B25J 15/026* (2013.01); *B25J 13/08* (2013.01); *B25J 19/02* (2013.01)

(58) Field of Classification Search
  CPC .. B25J 15/026; B25J 15/0266; B25J 15/0273; B25J 15/0253; B25J 15/106; B25J 13/08; B25J 13/081; B25J 13/084; B25J 19/02
  See application file for complete search history.

(56) References Cited

U.S. PATENT DOCUMENTS

| | | | |
|---|---|---|---|
| 4,680,523 A | 7/1987 | Goumas | |
| 4,707,013 A | 11/1987 | Vranish | |
| 5,161,847 A | 11/1992 | Yakou | |

(Continued)

FOREIGN PATENT DOCUMENTS

| | | |
|---|---|---|
| JP | 4-82686 A | 3/1992 |
| JP | 05-084685 | 4/1993 |

(Continued)

*Primary Examiner* — Dean J Kramer
(74) *Attorney, Agent, or Firm* — Oblon, McClelland, Maier & Neustadt, L.L.P.

(57) ABSTRACT

According to one embodiment, a holding mechanism includes a first holding part, a second holding part, a first guide, a second guide, a third guide, a fourth guide, and a driving mechanism. The second holding part faces the first holding part in a first direction. The first guide is connected to the first holding part and capable of moving the first holding part in the first direction. The second guide is connected to the second holding part and capable of moving the second holding part in the first direction. The third guide is capable of moving the first guide in the first direction. The fourth guide is capable of moving the second guide in the first direction, and aligned with the third guide in the first direction. The drive mechanism changes a distance between the first holding part and the second holding part.

4 Claims, 16 Drawing Sheets

(56) References Cited

U.S. PATENT DOCUMENTS

| | | | |
|---|---|---|---|
| 5,163,729 A | 11/1992 | Borcea | |
| 6,264,419 B1 | 7/2001 | Schinzel | |
| 6,309,003 B1 | 10/2001 | Bertini | |
| 7,645,111 B2 | 1/2010 | Mori et al. | |
| 8,295,975 B2 | 10/2012 | Arimatsu et al. | |
| 8,388,035 B2 | 3/2013 | Kamon et al. | |
| 8,556,318 B2 * | 10/2013 | Wu | H01L 21/68707 294/207 |
| 8,752,874 B2 | 6/2014 | Murakami et al. | |
| 8,915,527 B2 * | 12/2014 | Watanabe | B25J 15/08 294/99.1 |
| 9,457,480 B2 | 10/2016 | Usami | |
| 10,744,653 B2 * | 8/2020 | Tanaka | B25J 15/026 |
| 2010/0131100 A1 | 5/2010 | Takano | |
| 2014/0125080 A1 | 5/2014 | Dan | |
| 2016/0075031 A1 | 3/2016 | Gotou | |

FOREIGN PATENT DOCUMENTS

| | | |
|---|---|---|
| JP | 2002-144262 | 5/2002 |
| JP | 2003-136163 A | 5/2003 |
| JP | 2004-106105 | 4/2004 |
| JP | 2005-262325 | 9/2005 |
| JP | 2006-035329 | 2/2006 |
| JP | 2008-200759 | 9/2008 |
| JP | 2010-012567 | 1/2010 |
| JP | 2010-162638 | 7/2010 |
| JP | 2011-173208 A | 9/2011 |
| JP | 2011-177863 A | 9/2011 |
| JP | 2011-235397 A | 11/2011 |
| JP | 4892257 | 3/2012 |
| JP | 5351161 | 11/2013 |
| JP | 5492168 | 5/2014 |
| JP | 2015-140829 | 8/2015 |
| JP | 2015-222738 | 12/2015 |
| JP | 5361255 | 2/2016 |

* cited by examiner

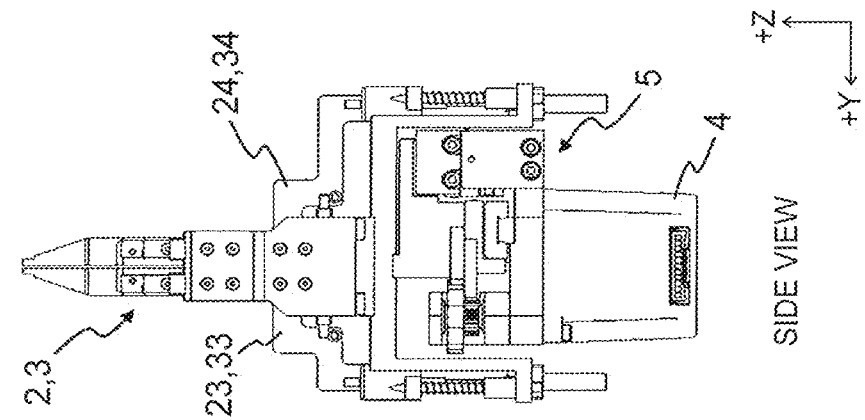
FIG. 5C SIDE VIEW
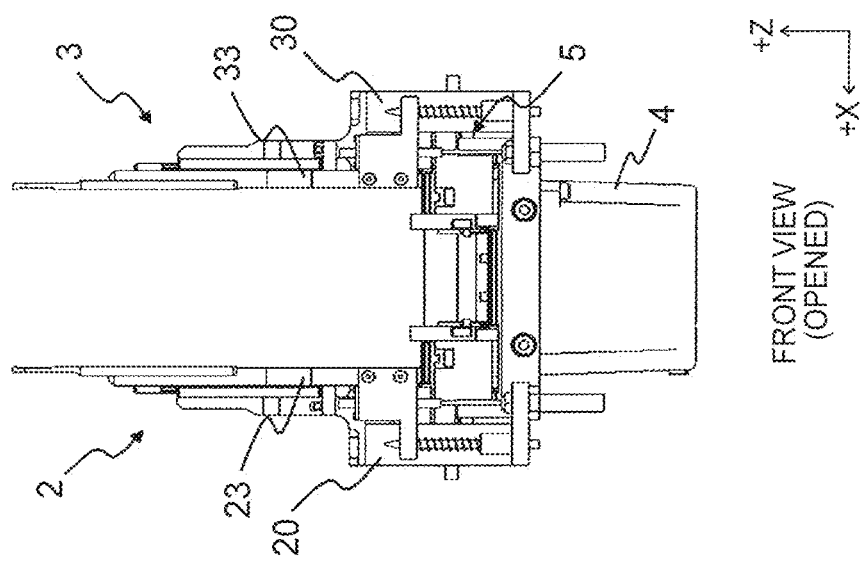
FIG. 5B FRONT VIEW (OPENED)
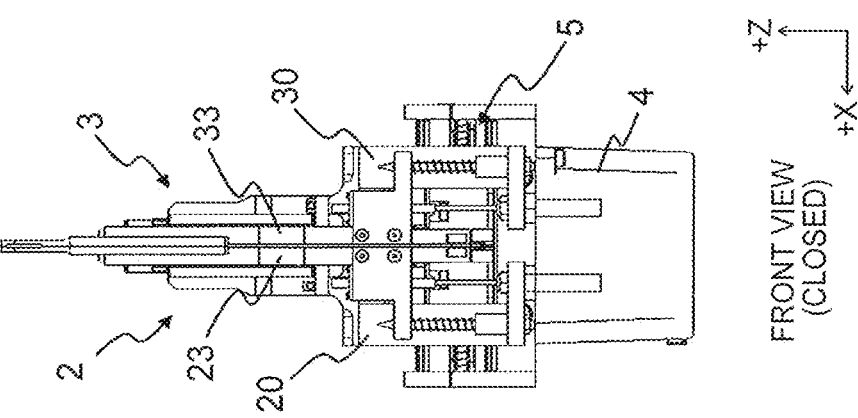
FIG. 5A FRONT VIEW (CLOSED)

FRONT VIEW (CLOSED)

FRONT VIEW (OPENED)

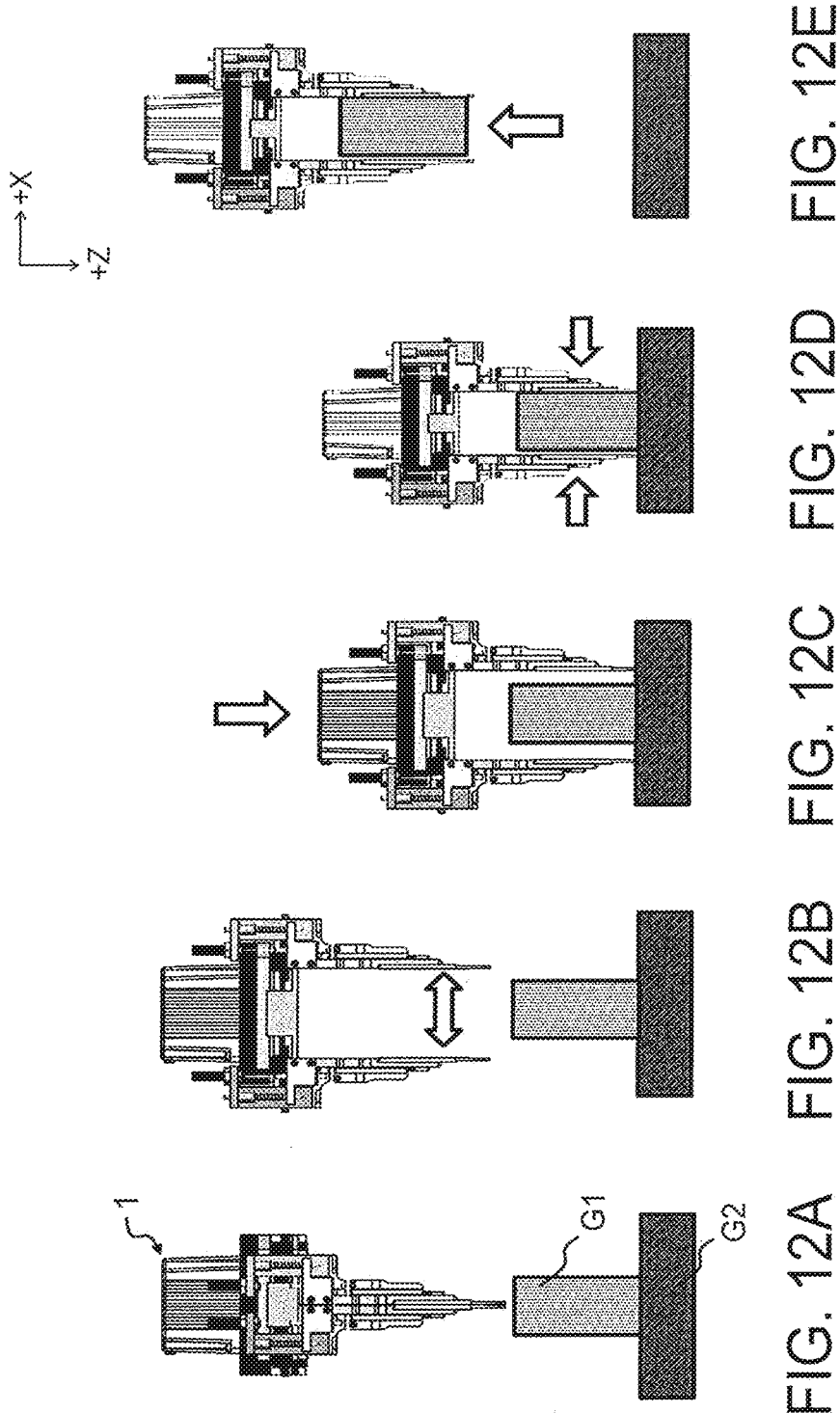

HOLDING MECHANISM, TRANSFER DEVICE, HANDLING ROBOT SYSTEM, AND ROBOT HANDLING METHOD

CROSS-REFERENCE TO RELATED APPLICATION

This application is a division of U.S. application Ser. No. 15/684,997, filed Aug. 24, 2017, which is based upon and claims the benefit of priority from Japanese Patent Application No. 2017-053464, filed on Mar. 17, 2017; the entire contents of which are incorporated herein by reference.

FIELD

Embodiments described herein relate generally to a holding mechanism, a transfer device, a handling robot system, and a robot handling method.

BACKGROUND

In recent years, with the expansion of mail-orders, a transaction volume of objects (also referred to as goods or work) is increasing in the field of physical distribution. Meanwhile, labor shortages, with a backdrop of an aging society with fewer children, are a concern within the country, and needs for saving manpower, automation of distribution centers, and the like are rapidly increasing. In the latest distribution centers, material handling devices are used for automated storage, acceptance or delivery, conveyance, and sorting. As a holding mechanism of the material handling devices, a mechanism that is arranged in a tip end of a multi-joined manipulator and that clamps an object with two holding parts is often employed. Work to pick and pack objects needs to include the ability to hold a wide variety of objects. For example, in a case of holding a large object, the holding parts need to be largely driven and thus the holding mechanism is increased in size. In a case of accurately holding a soft object, a sensor that senses a state of the object and a surrounding environment needs to be provided and thus the holding mechanism is increased in size and is complicated.

In this way, with the increase in the size of the holding mechanism, an object placed in a narrow space cannot be accurately held and many operations are still human-intensive. Further, accurately sensing the state of the object and the surrounding environment is difficult and the held object is sometimes damaged.

Development of a holding mechanism that achieves both downsizing of the holding mechanism and sensing of the object state has been desired.

BRIEF DESCRIPTION OF THE DRAWINGS

FIGS. 5A to 5C are front views and a side view of the holding mechanism.

FIGS. 12A to 12E are diagrams illustrating an example of a holding operation of the holding mechanism.

DETAILED DESCRIPTION

According to one embodiment, a holding mechanism includes a first holding part, a second holding part, a first guide, a second guide, a third guide, a fourth guide, and a driving mechanism. The second holding part faces the first holding part in a first direction. The first guide is connected to the first holding part and capable of moving the first holding part in the first direction. The second guide is connected to the second holding part and capable of moving the second holding part in the first direction. The third guide is capable of moving the first guide in the first direction. The fourth guide is capable of moving the second guide in the first direction, and aligned with the third guide in the first direction. The drive mechanism changes a distance between the first holding part and the second holding part.

Hereinafter, a holding mechanism and a handling robot system according to embodiments will be described with reference to the drawings. Elements denoted with the same reference sign represent similar elements. The drawings are schematic or conceptual drawings and the relationships between the thickness and width of parts, the proportional coefficients of sizes among parts, etc., are not necessarily the same as actual values thereof. Further, the dimensions and proportional coefficients may be differently illustrated among drawings, even for identical parts.

First Embodiment

Figure 1:
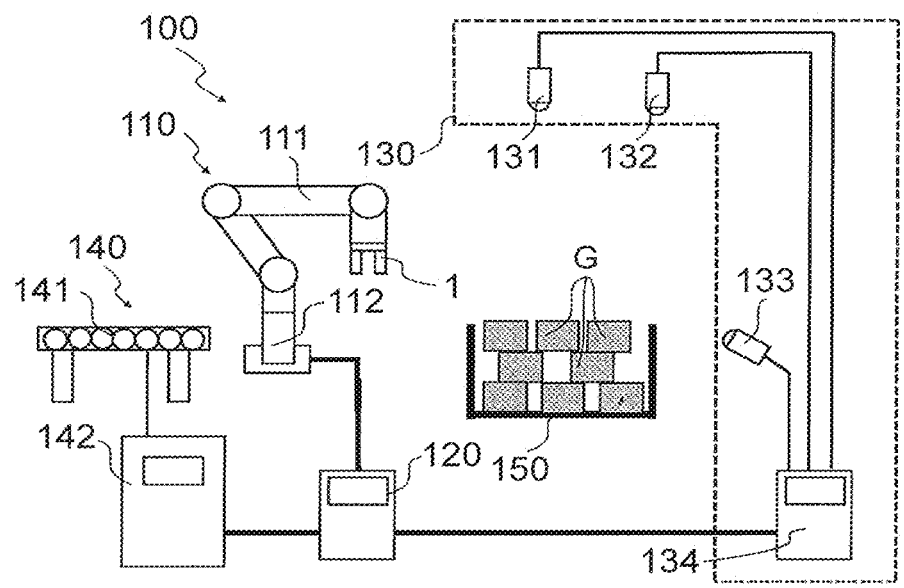
FIG. 1 is a schematic diagram illustrating an example of a handling robot system using a holding mechanism according to a first embodiment.

A first embodiment will be described with reference to FIG. 1. FIG. 1 is a schematic diagram illustrating an example of a handling robot system using a holding mechanism according to the first embodiment.

As illustrated in FIG. 1, a handling robot system 100 includes a transfer device 110, a control device 120, a recognition device 130, and a conveyance device 140.

The handling robot system 100 recognizes a plurality of objects G placed on a loading area 150 by the recognition device 130. The control device 120 then drives the transfer device 110, using a recognition result, to move the object G to the conveyance device 140 while holding the object G. Further, the control device 120 places the object G positioned on the conveyance device 140 to the loading area 150 while holding the object G by the transfer device 110. Examples of the object G includes a product put in a cardboard box, a packaged product, and a single product.

Figure 2:
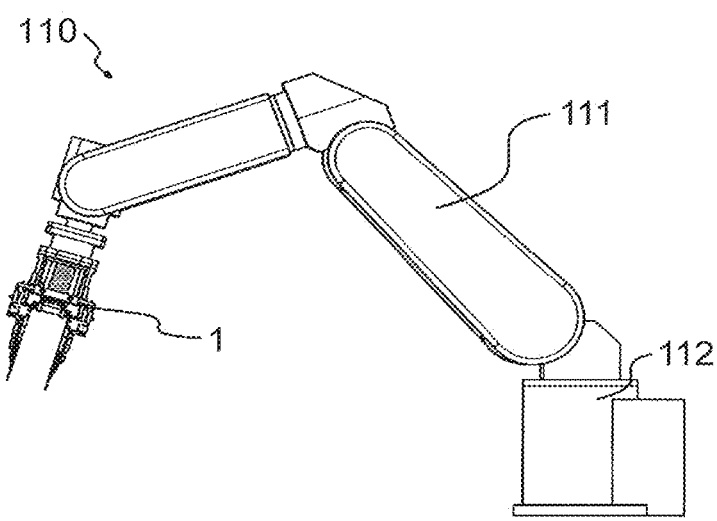
FIG. 2 is a diagram illustrating an example of a transfer device using the holding mechanism according to the first embodiment.

First, the transfer device 110 will be described. FIG. 2 is a diagram illustrating an example of the transfer device 110 using a holding mechanism 1 according to the present embodiment. As illustrated in FIG. 2, the transfer device 110 includes a manipulator 111, a base 112 that fixes the manipulator 111, and the holding mechanism 1 arranged to a tip end of the manipulator 111 and which holds the object G.

The manipulator 111 includes at least two links and a plurality of joints respectively connecting with ends of the links. The joint is configured from a motor, an encoder, a speed reducer, and the like. The manipulator 111 causes the links to be rotatable or linearly movable by driving of the motor. With the configuration, the manipulator 111 moves the holding mechanism 1 provided to the tip end. Rotation of the joint is not limited to rotation in one-axial direction and includes rotation in multiaxial directions. The manipulator 111 is so-called a vertically articulated robot. Further, the manipulator 111 may be configured from a combination of a linear motion mechanism in triaxial (XYZ-axis) directions, a rotation shaft that rotates the links, and joints.

The base 112 fixes an end of the manipulator 111. The base 112 is installed in a floor or the ground. The base 112 is, for example, a movable cart, and the transfer device 110 may be movable on the floor.

The holding mechanism 1 includes at least two holding parts capable of holding the object G. These holding parts are arranged in contact with each other. When holding the object G, the holding mechanism 1 reduces the distance between the holding parts to allow the holding parts to come in contact with the object G, and clamp and hold the object G.

Next, a configuration of the holding mechanism 1 according to the present embodiment will be described in detail with reference to FIGS. 3 to 9.

Figure 3B:
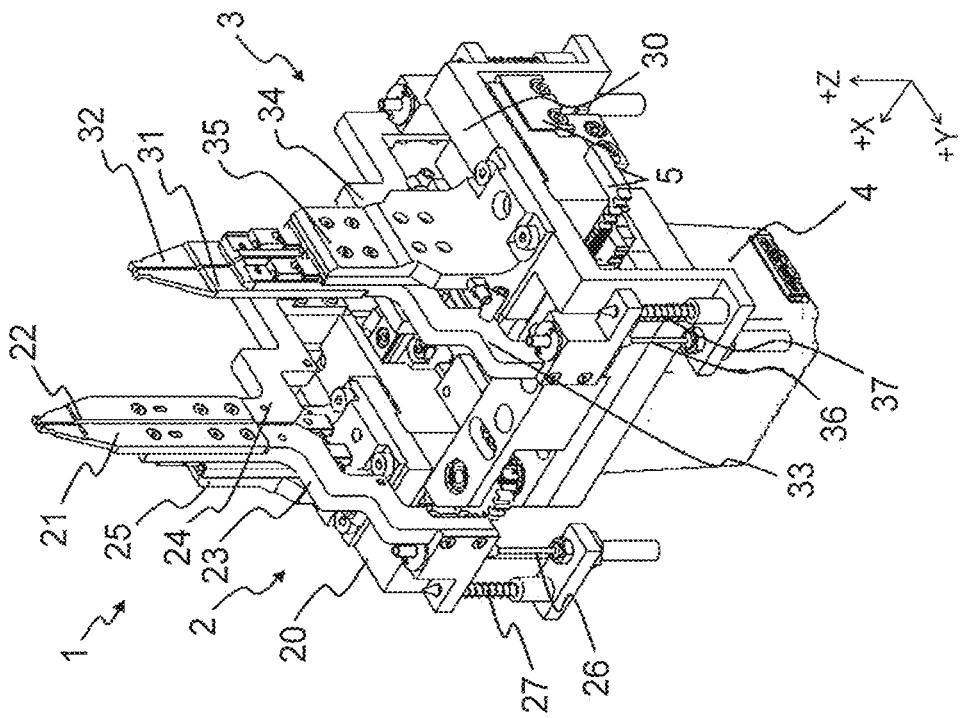
FIGS. 3A and 3B are diagrams illustrating an example of the holding mechanism according to the first embodiment.
Figure 3A:
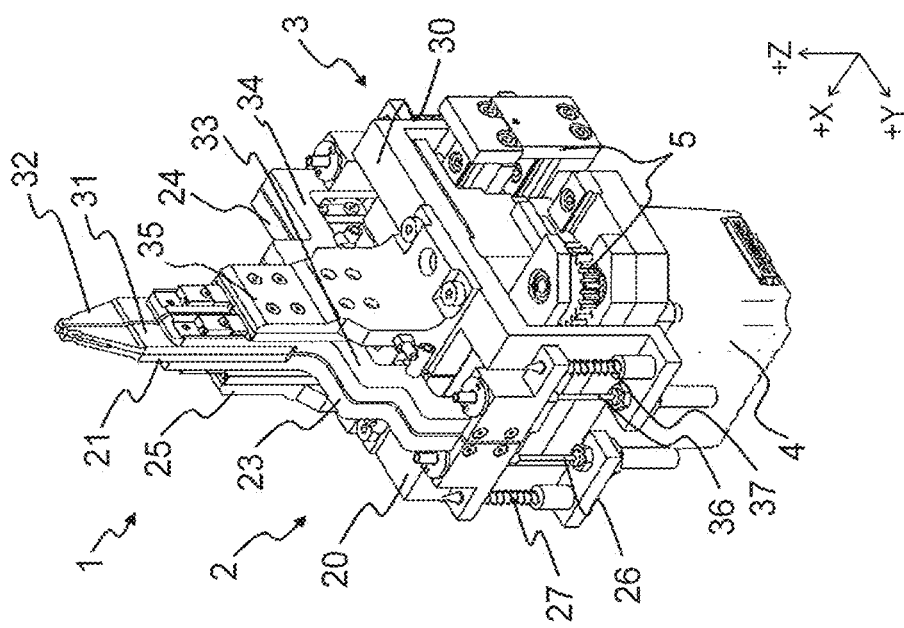

FIGS. 3A and 3B are perspective views illustrating an example of the holding mechanism 1 according to the present embodiment. FIG. 3A illustrates a state in which the holding mechanism 1 is closed. FIG. 3B illustrates a state in which the holding mechanism 1 is opened.

Figure 4B:
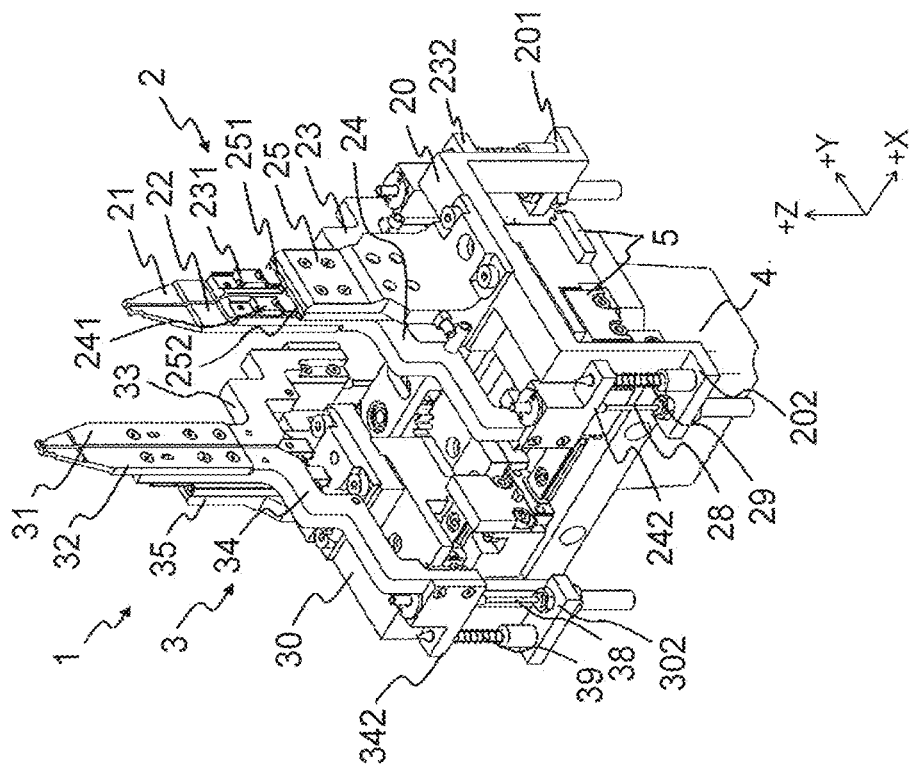
FIGS. 4A and 4B are perspective views of a state in which the holding mechanism is opened.
Figure 4A:
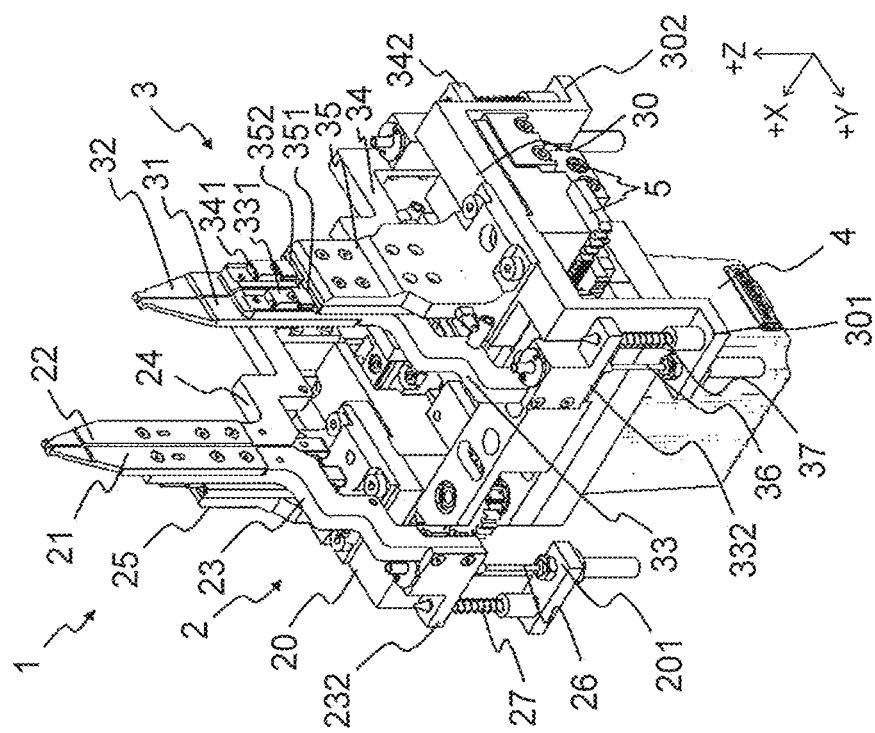

FIGS. 4A and 4B are perspective views of the state in which the holding mechanism 1 is opened. FIG. 4A is a front perspective view, and FIG. 4B is a back perspective view.

FIGS. 5A to 5C are front views and a side view of the holding mechanism 1. FIGS. 5A and 5B are front views of the states in which the holding mechanism 1 is closed and opened. FIG. 5C is a side view of the holding mechanism 1. For simplification, a case in which the holding parts are two (i.e., a first holding part and a second holding part) will be described. The holding mechanism 1 being in the "closed state" indicates a state in which the first holding part and the second holding part are in contact with each other. Also, the holding mechanism 1 being in the "opened state" indicates a state in which the first holding part and the second holding part are separated from each other.

Here, for convenience of description, +X direction, −X direction, +Y direction, −Y direction, +Z direction, and −Z direction will be defined. The +X direction, the −X direction, the +Y direction, and the −Y direction are directions along an approximately horizontal surface, for example. The −X direction is an opposite direction of the +X direction. In the embodiment, the +X direction and the −X direction are "directions along which the holding parts are moved". The +Y direction is a direction intersecting with the +X direction (for example, a direction approximately perpendicular to the +X direction). The −Y direction is an opposite direction of the +Y direction. The +Z direction is a direction intersecting with the +X direction and the +Y direction (for example, a direction approximately perpendicular to the +X and +Y directions) and is an approximately vertically upward direction, for example. The −Z direction is an opposite direction of the +Z direction and is an approximately vertically downward direction, for example. The coordinate axes of the definition are determined on the basis of the holding mechanism 1 and thus are appropriately changed according to the direction of the holding mechanism 1 installed to the manipulator 111.

As illustrated in FIGS. 3A and 3B, and FIGS. 4A and 4B, the holding mechanism 1 includes a first holding part 2, a second holding part 3, a base 4, and a moving mechanism 5 provided on the base 4 and which moves the first holding part 2 and the second holding part 3 in the +X and −X directions, respectively.

The first holding part 2 makes a pair with the second holding part 3 to clamp and hold the object G.

The first holding part 2 includes a first moving part 20, a first holding arm 21, a second holding arm 22, a first link 23 connected with one end of the first holding arm 21, a second link 24 connected with one end of the second holding arm 22, a first guide 25 fixed to the first moving part 20 and to which the first link 23 and the second link 24 are connected, a first sensor 26 and a first elastic part 27 arranged between the other end of the first link 23 and an end of the first moving part 20, and a second sensor 28 and a second elastic part 29 arranged between the other end of the second link 24 and an end of the first moving part 20.

The first moving part 20 is connected with a third rack and a third guide of the moving mechanism 5 described below. The first moving part 20 is movable in the +X direction or the −X direction (also referred to as first direction) along the third guide.

The first holding arm 21 and the second holding arm 22 make a pair with a third holding arm and a fourth holding arm of the second holding part 3 described below and hold the object G. The first to fourth holding arms may be collectively referred to as holding arm.

The first link 23 has one end connected with the first holding arm 21, and a slide guide 231 provided in the first link 23 is connected to a slide rail 251 provided in the first guide 25 (see FIG. 4B). With the connection, the first guide 25 supports the first holding arm 21 and the first link 23 in the +Z direction. The slide guide 231 and the slide rail 251 are provided along the Z direction. Therefore, the first holding arm 21 and the first link 23 are movable in the +Z direction or the −Z direction (also referred to as second direction) along the first guide 25. As illustrated in FIG. 5C, the first link 23 is arranged to have a gap so as not to interfere with the base 4 and the moving mechanism 5 when the first link 23 is moved in the Z direction. The other end 232 of the first link is connected to an end 201 of the first moving part through the first sensor 26 and the first elastic part 27 (see FIG. 4A). The first elastic part 27 biases the first holding arm 21 and the first link 23 in the +Z direction. The first elastic part 27 applies elastic force of the Z direction to between the other end 232 of the first link 23 and the end 201 of the first moving part 20. A stopper (not illustrated) is favorably provided to the slide rail 251 of the first guide 25 so that the first link 23 stands still at a predetermined position in the +Z direction. The first elastic part 27 may be formed of any member as long as the member can generate the elastic force on a steady basis, such as spring. The first sensor 26 is a displacement sensor that measures a displacement amount of the first holding arm 21 in the Z direction. A measuring range of the displacement amount by the first sensor 26 is a range of the distance between the end 201 of the first moving part 20 and the other end 232 of the first link 23 in the Z direction. Therefore, when a wide range of displacement needs to be measured, it is better to make the distance between the end 201 of the first moving part 20 and the other end 232 of the first link 23 in the Z direction wide. The first sensor 26 may include the first elastic part 27.

The second link 24 has one end connected with the second holding arm 22, and a slide guide 241 provided in the second link 24 is connected to a slide rail 252 provided in the first guide 25 (see FIG. 4B). With the connection, the first guide 25 supports the second holding arm 22 and the second link 24 in the +Z direction. The slide guide 241 and the slide rail 252 are provided along the Z direction. Therefore, the second holding arm 22 and the second link 24 are movable in the +Z direction or the −Z direction along the first guide 25. As illustrated in FIG. 5C, the second link 24 is arranged to have a gap so as not to interfere with the base 4 and the moving mechanism 5 when the second link 24 is moved in the Z direction. The other end 242 of the second link is connected to an end 202 of the first moving part 20 through the second sensor 28 and the second elastic part 29 (see FIG. 4B). The second elastic part 29 biases the second holding arm 22 and the second link 24 in the +Z direction. The second elastic part 29 applies elastic force of the Z direction to between the other end 242 of the second link 24 and the end 202 of the first moving part 20. The second elastic part 29 may be formed of any member as long as the member can generate the elastic force on a steady basis, such as spring. A stopper (not illustrated) is favorably provided to the slide rail 252 of the first guide 25 so that the second link 24 stands still at a predetermined position in the +Z direction. The second sensor 28 is a displacement sensor that measures a displacement amount of the second holding arm 22 in the Z direction. A measuring range of the displacement amount by the second sensor 28 is a range of the distance between the end 202 of the first moving part 20 and the other end 242 of the second link 24 in the Z direction. Therefore, when a wide range of displacement needs to be measured, it is better to make the distance between the end 202 of the first moving part 20 and the other end 242 of the second link 24 in the Z direction wide. The second sensor 28 may include the second elastic part 29.

While the positions in the Y direction of the first holding arm 21 and the second holding arm 22 are determined by the slide rails 251 and 252 provided in the first guide 25, the holding arms are favorably arranged to have a slight gap. Further, the first holding arm 21 and the second holding arm 22 are individually movable in the Z direction. The first holding arm may include the first link. Also, the second holding arm may include the second link. The first holding part 2 including the first holding arm 21 and the second holding arm 22 has been described. However, the first holding arm 21 and the second holding arm 22 may be integrally formed to form one holding arm.

The second holding part 3 includes a second moving part 30, a third holding arm 31, a fourth holding arm 32, a third link 33 connected with one end of the third holding arm 31, a fourth link 34 connected with one end of the fourth holding arm 32, a second guide 35 fixed to the second moving part 30 and connected to the third link 33 and the fourth link 34, a third sensor 36 and a third elastic part 37 arranged between the other end of the third link 33 and an end of the second moving part 30, and a fourth sensor 38 and a fourth elastic part 39 arranged between the other end of the fourth link 34 and an end of the second moving part 30.

The second moving part 30 is connected with a fourth rack and a fourth guide of the moving mechanism 5 described below. The second moving part 30 is movable in the X direction along the fourth guide.

The third link 33 has one end connected with the third holding arm 31, and a slide guide 331 provided in the third link 33 is connected to a slide rail 351 provided in the second guide 35 (see FIG. 4A). With the connection, the second guide 35 supports the third holding arm 31 and the third link 33 in the +Z direction. The slide guide 331 and the slide rail 351 are provided along the Z direction. Therefore, the third holding arm 31 and the third link 33 are movable in the Z direction along the second guide 35. The third link 33 is arranged to have a gap so as not to interfere with the base 4 and the moving mechanism 5 when the third link 33 is moved in the Z direction. The other end 332 of the third link 33 is connected to an end 301 of the second moving part 30 through the third sensor 36 and the third elastic part 37 (see FIG. 4A). The third elastic part 37 biases the third holding arm 31 and the third link 33 in the +Z direction. The third elastic part 37 applies elastic force of the Z direction to between the other end 332 of the third link 33 and the end 301 of the second moving part 30. The third elastic part 37 may be formed of any member as long as the member can generate elastic force on a steady basis, such as spring. A stopper (not illustrated) is favorably provided to the slide rail 351 of the second guide 35 so that the third link 33 stands still at a predetermined position in the +Z direction. The third sensor 36 is a displacement sensor that measures a displacement amount of the third holding arm 31 in the Z direction. A measuring range of the displacement amount of the third sensor 36 is a range of the distance between the end 301 of the second moving part 30 and the other end 332 of the third link 33 in the Z direction. Therefore, when a wide range of displacement needs to be measured, it is better to make the distance between the end 301 of the second moving part 30 and the other end 332 of the third link 33 in the Z direction wide. The third sensor 36 may include the third elastic part 37.

The fourth link 34 has one end connected with the fourth holding arm 32, and a slide guide 341 provided in the fourth link 34 is connected to a slide rail 352 provided in the second guide 35 (see FIG. 4A). With the connection, the second guide 35 supports the fourth holding arm 32 and the fourth link 34 in the +Z direction. The slide guide 341 and the slide rail 352 are provided along the Z direction. Therefore, the fourth holding arm 32 and the fourth link 34 are movable in the +Z direction or the −Z direction along the second guide 35. The fourth link 34 is arranged to have a gap so as not to interfere with the base 4 and the moving mechanism 5 when the fourth link 34 is moved in the Z direction. The other end 342 of the fourth link 34 is connected to an end 302 of the second moving part 30 through the fourth sensor 38 and the fourth elastic part 39 (see FIG. 4B). The fourth elastic part 39 biases the fourth holding arm 32 and the fourth link 34 in the +Z direction. The fourth elastic part 39 applies elastic force of the Z direction to between the other end 342 of the fourth link 34 and the end 302 of the second moving part. A stopper (not illustrated) is favorably provided to the slide rail 352 of the second guide 35 so that the fourth link 34 stands still at a predetermined position in the +Z direction. The fourth elastic part 39 may be formed of any member as long as the member can generate the elastic force on a steady basis, such as spring. The fourth sensor 38 is a displacement sensor that measures a displacement amount of the fourth holding arm 32 in the Z direction. A measuring range of the displacement amount of the fourth sensor 38 is a range of the distance between the end 302 of the second moving part 30 and the other end 342 of the fourth link 34 in the Z direction. Therefore, when a wide range of displacement needs to be measured, it is better to make the distance between the end 302 of the second moving part 30 and the other end 342 of the fourth link 34 in the Z direction wide. The fourth sensor 38 may include the fourth elastic part 39. The above-described first to fourth sensors may be referred to as detectors. The first to fourth sensors may be made of a linear encoder, an ultrasonic sensor, a variable resistance, a capacitive sensor, a pulse coder, a fiber sensor, or a laser displacement sensor, for example. Further, other sensors that output a voltage or a current according to displacement may be used. Further, the first to fourth sensors are not limited to the displacement sensors. For example, force sensors or pressure sensors may be used.

While the positions in the Y direction of the third holding arm 31 and the fourth holding arm 32 are determined by the slide rails 351 and 352 provided in the second guide 35, the holding arms are favorably arranged to have a slight gap in the Y direction. Further, the third holding arm 31 and the fourth holding arm 32 are individually movable in the Z direction. Further, the third holding arm may include the third link. Further, the fourth holding arm may include the fourth link. Further, the second holding part 3 including the third holding arm 31 and the fourth holding arm 32 has been described. However, the third holding arm 31 and the fourth holding arm 32 may be integrally formed to form one holding arm.

The first holding part 2 and the second holding part 3 are favorably arranged in an approximately symmetrical manner to a surface perpendicular to the X axis.

In the present embodiment, the first holding part 2 and the second holding part 3 have a plate-like shape and are tapered, and the first to fourth elastic parts and the first to fourth sensors are arranged to be separated from the tip ends of the first holding part 2 and the second holding part 3. With such a configuration, an effect that the first holding part 2 and the second holding part 3 can be easily fit into a narrow gap or the like can be obtained.

The base 4 is a place where the moving mechanism 5 connecting the first holding part 2 and the second holding part 3 is installed. The base 4 is connected to a tip end of the manipulator 111 (see FIGS. 1 and 2). A connector and wiring for being connected with the manipulator 111, a motor for driving the first holding part 2 and the second holding part 3, and the like may be built in the base 4, for example.

Next, a configuration of the moving mechanism 5 will be described.

The moving mechanism 5 of the holding mechanism 1 will be described with reference to FIGS. 6A to 6D to FIGS. 9A and 9B.

Figure 6A:
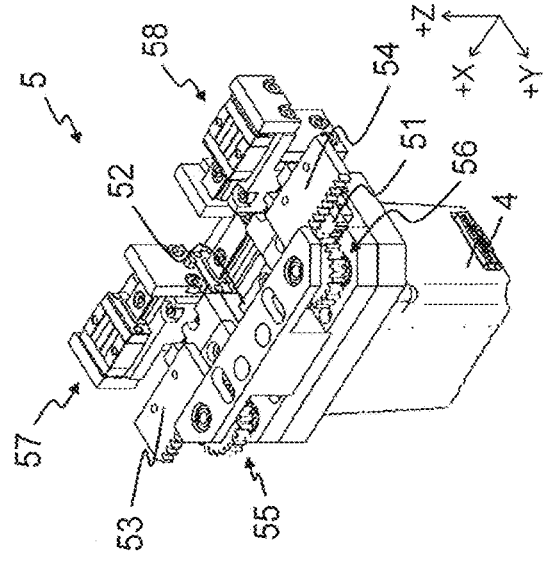
FIGS. 6A to 6D are perspective views and top views illustrating a configuration of a moving mechanism installed on a base.
Figure 6B:
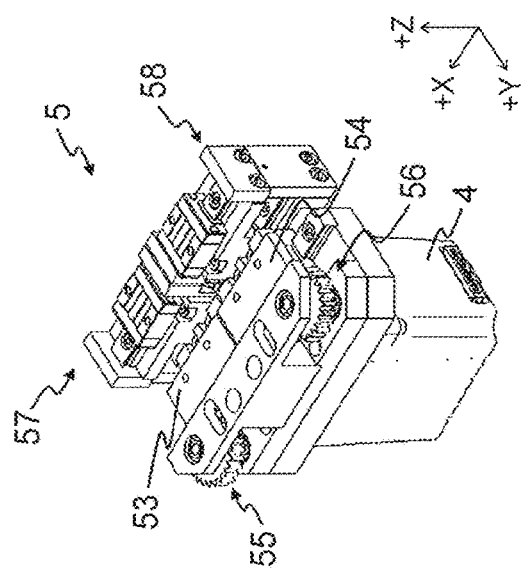
Figure 6C:
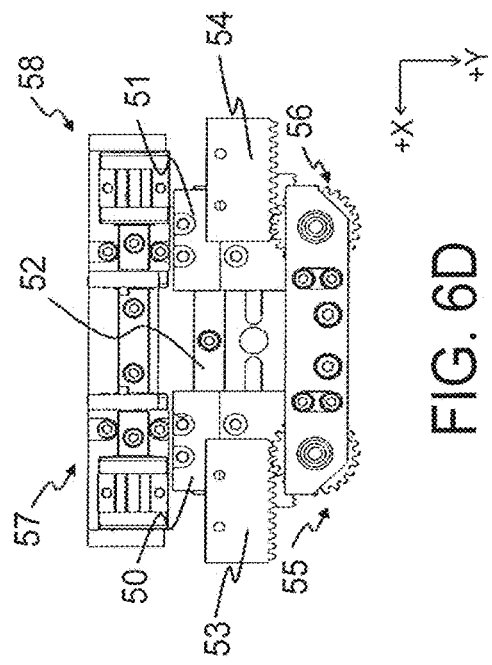
Figure 6D:
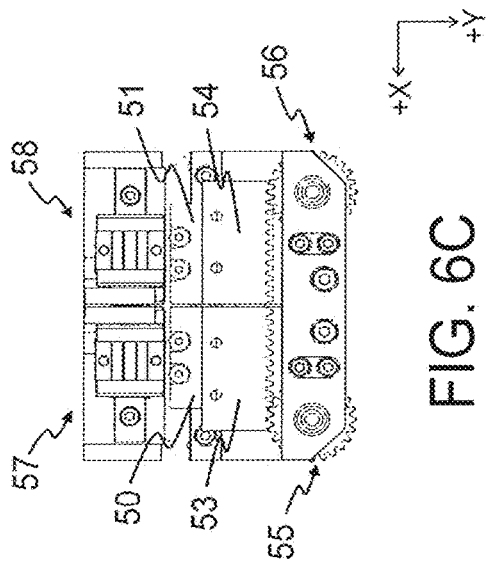

FIGS. 6A to 6D are perspective views and top views illustrating the configuration of the moving mechanism 5 installed on the base 4. For simplification, the first holding part 2 and the second holding part 3 are omitted. FIGS. 6A and 6B are perspective views illustrating the base 4 and the moving mechanism 5 in states where the holding mechanism 1 is closed and opened. FIGS. 6C and 6D are top views illustrating the base 4 and the moving mechanism 5 in states where the holding mechanism 1 is closed and opened.

Figure 7A:
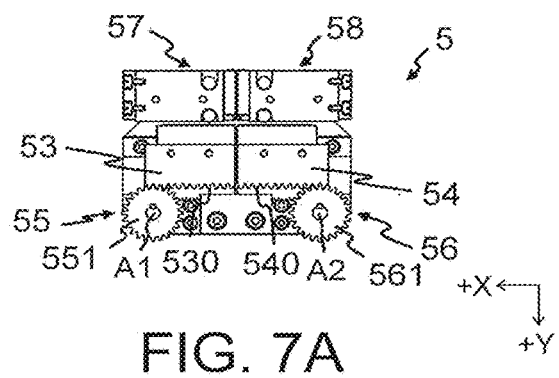
FIGS. 7A to 7F are front views and sectional views illustrating the configuration of the moving mechanism installed on the base.
Figure 7B:
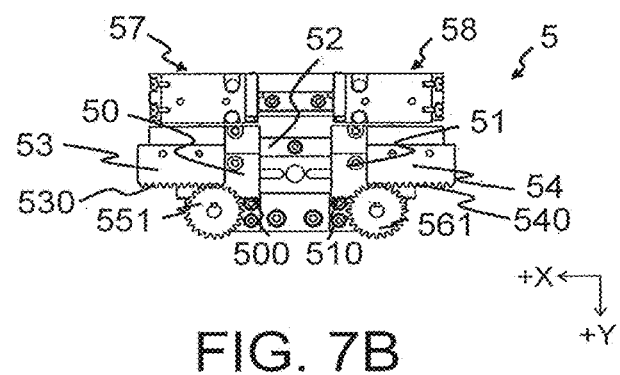
Figure 7C:
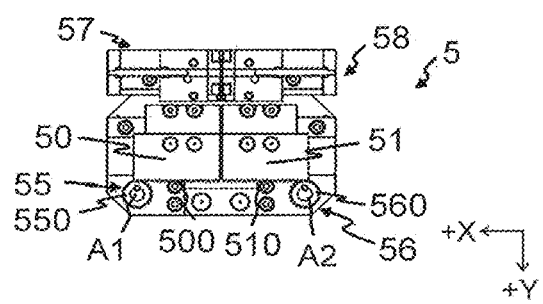
Figure 7D:
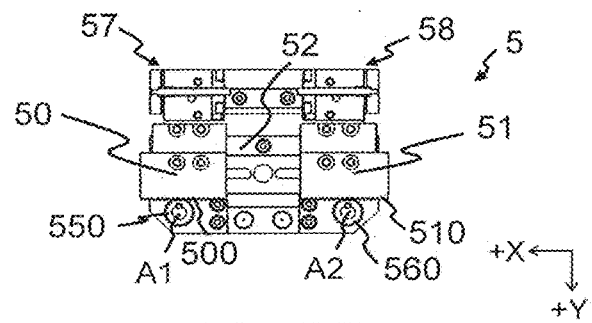
Figure 7E:
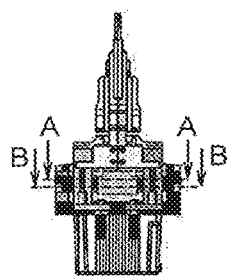
Figure 7F:
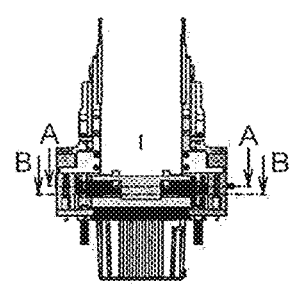

FIGS. 7A to 7F are front views and sectional views illustrating the configuration of the moving mechanism 5 installed on the base 4. For simplification, the first holding part 2 and the second holding part 3 are omitted. FIGS. 7A and 7B are A-A sectional views in states where the holding mechanism 1 is closed and opened (as illustrated in FIGS. 7E and 7F). FIGS. 7C and 7D are B-B sectional views in states where the holding mechanism 1 is closed and opened (as illustrated in FIGS. 7E and 7F).

As illustrated in FIGS. 6A to 6D and FIGS. 7A to 7D, the moving mechanism 5 includes a first rack 50, a second rack 51, a drive part 52 that drives the first rack 50 and the second rack 51 in the first direction (the X direction or the −X direction), a third rack 53 positioned in the +Z direction with respect to the first rack 50, a fourth rack 54 positioned in the +Z direction with respect to the second rack 51, a first gear wheel 55 (also referred to as first gear) meshed with the first rack 50 and the third rack 53 with gear wheels having different radiuses respectively, a second gear wheel 56 (also referred to as second gear) meshed with the second rack 51 and the fourth rack 54 with gear wheels having different radiuses respectively, a third guide 57, and a fourth guide 58. A configuration except for the third guide 57 and the fourth guide 58, among the configuration of the moving mechanism 5, may be referred to as drive mechanism.

The first moving part 20 of the first holding part 2 is connected with the third rack 53 and the third guide 57. Further, the second moving part 30 of the second holding part 3 is connected with the fourth rack 54 and the fourth guide 58.

The first rack 50 and the second rack 51 are formed into plate-like approximately rectangular parallelepiped shapes respectively, and are arranged along the X direction. Further, the first rack 50 and the second rack 51 are positioned at approximately the same height in the Z direction. A side surface 500 of the first rack 50 on the side where the first gear wheel 55 is positioned is provided with a plurality of teeth and is meshed with the first gear wheel 55. Further, a side surface 510 of the second rack 51 on the side where the second gear wheel 56 is positioned is provided with a plurality of teeth and is meshed with the second gear wheel 56. The first rack 50 and the second rack 51 are connected with the drive part 52, and are moved in the X direction by drive force of the drive part 52. For example, the first rack 50 is moved in the +X direction and the second rack 51 is moved in the −X direction (at this time, the holding mechanism is in the opened state). Further, the first rack 50 is moved in the −X direction and the second rack 51 is moved in the +X direction (at this time, the holding mechanism is in the closed state). The first gear wheel 55 and second gear wheel 56 are rotated by driving the first rack 50 and second rack 51.

The drive part 52 is installed on the base 4. The drive part 52 symmetrically moves the second rack 51 with respect to the first rack 50. The symmetrically moving is moving the second rack 51 in the −X direction when the first rack 50 is moved in the +X direction, for example. Alternatively, the first rack 50 and the second rack 51 may be individually movable in the +X direction or the −X direction. The drive part 52 includes a transverse ball screw and a stepping motor, for example, and is moved in the X direction by being driven by the stepping motor. The drive part 52 may be driven by a linear actuator.

The third rack 53 and the fourth rack 54 are formed into plate-like approximately rectangular parallelepiped shapes respectively, and are arranged along the X direction. The third rack 53 is positioned in the +Z direction with respect to the first rack 50 and is arranged in a position overlapping with the first rack 50. The fourth rack 54 is positioned in the +Z direction with respect to the second rack 51 and is arranged in a position overlapping with the second rack 51. The third rack 53 and the fourth rack 54 are positioned at approximately the same height in the Z direction. A side surface 530 of the third rack 53 on the side where the first gear wheel 55 is provided with a plurality of teeth and is meshed with the first gear wheel 55. Further, a side surface 540 of the fourth rack 54 on the side where the second gear wheel 56 is positioned is provided with a plurality of teeth and is meshed with the second gear wheel 56. When the first rack 50 is driven by the drive part 52, the first gear wheel 55 is rotated, and the third rack 53 is moved using rotating force of the rotation of the first gear wheel 55. The third rack 53 is connected with the third guide 57 described below through the first moving part 20. Therefore, the third rack 53 is moved in the X direction that is a moving direction of the third guide 57. Similarly in the fourth rack 54, when the second rack 51 is driven by the drive part 52, the second gear wheel 56 is rotated, and the fourth rack 54 is moved using rotating force of the rotation of the second gear wheel 56. The fourth rack 54 is connected with the fourth guide 58 described below through the second moving part 30. Therefore, the fourth rack 54 is moved in the X direction that is a moving direction of the fourth guide 58.

The first gear wheel 55 and the second gear wheel 56 are installed on the base 4. The first gear wheel 55 (also referred to as first gear) is rotatable around a first shaft A1 provided in the base 4. Further, the second gear wheel 56 (also referred to as second gear) is rotatable around a second shaft A2 provided in the base 4. The first shaft A1 and the second shaft A2 are arranged in the X direction and are installed with a space. The axial direction of the first shaft A1 and the axial direction of the second shaft A2 are approximately parallel to the Z direction. The first gear wheel 55 includes two gear wheels 550 and 551 having different radiuses on the same axis. The gear wheels 550 and 551 are integrally connected to form the first gear wheel 55. The gear wheel 550 is meshed with the first rack 50. The gear wheel 551 is meshed with the third rack 53. A radius of the gear wheel 550 is favorably smaller than a radius of the gear wheel 551. The second gear wheel 56 includes two gear wheels 560 and 561 having different radiuses on the same axis. The gear wheels 560 and 561 are integrally connected to form the second gear wheel 56. The gear wheel 560 is meshed with the second rack 51. The gear wheel 561 is meshed with the fourth rack 54. The radius of the gear wheel 560 is favorably smaller than the radius of the gear wheel 561. The gear wheels 550 and 560 have approximately the same shapes. Further, the gear wheels 551 and 561 have approximately the same shapes.

Here, moving amounts of the first rack 50 and the third rack 53 meshed with the first gear wheel 55 will be described. A pitch diameter of the gear wheel 550 of the first gear wheel 55 is Da, and a pitch diameter of the gear wheel 551 is Db. The pitch diameter is "the number of teeth of the gear wheel×a module (the size of a tooth of the gear wheel)". For example, when the drive part 52 is driven to move the first rack 50 in the +X direction, the gear wheel 550 meshed with the first rack 50 is rotated, and the gear wheel 551 is rotated by the first shaft A1 at the same rotation speed. Then, when the gear wheel 551 is rotated, the third rack 53 is moved in the +X direction. At this time, a ratio of a moving distance of the first rack 50 and a moving distance of the third rack 53 can be derived in advance. When the gear wheels 550 and 551 are rotated once, the moving distance of the first rack 50 becomes "n×Da". Meanwhile, the moving distance of the third rack 53 becomes "n×Db". That is, a value obtained by multiplying the diameter ratio of the gear wheels 550 and 551 with the moving amount of the first rack 50 becomes the moving amount of the third rack 53. To be specific, the ratio of the moving distances of the racks becomes "the ratio of the moving distances of the racks=the diameter ratio of the gear wheels", and thus "the ratio of the moving distances=Db/Da". For example, the ratio of the moving distances becomes 2, where the pitch diameter of the gear wheel 550 is "Da=12" and the pitch diameter of the gear wheel 551 is "Db=24". If a loss is ignored, an output to an input of the moving distance becomes double. This ratio becomes larger as the difference between Da and Db becomes larger. Further, the pitch diameter is "the number of teeth×the module", and is thus settable by the number of teeth or the module, or by both. By changing the diameters of the gear wheels 550 and 551, the moving amount of the third rack 53 as the output to the moving amount of the first rack 50 as the input can be increased. The same applies to the relationship of the moving amounts between the second gear wheel 56, and the second rack 51 and the fourth rack 54.

Next, configurations of the third guide 57 and the fourth guide 58 will be described with reference to FIGS. 8A to 8D and FIGS. 9A and 9B.

Figure 8B:
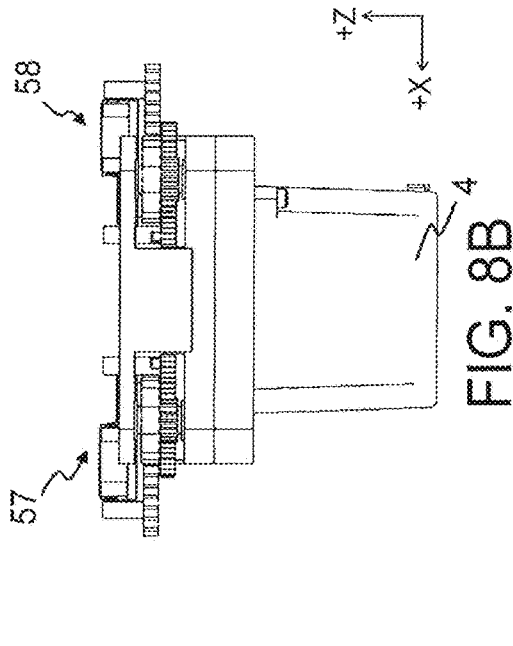
FIGS. 8A to 8D are diagrams illustrating configurations of a third guide and a fourth guide.
Figure 8A:
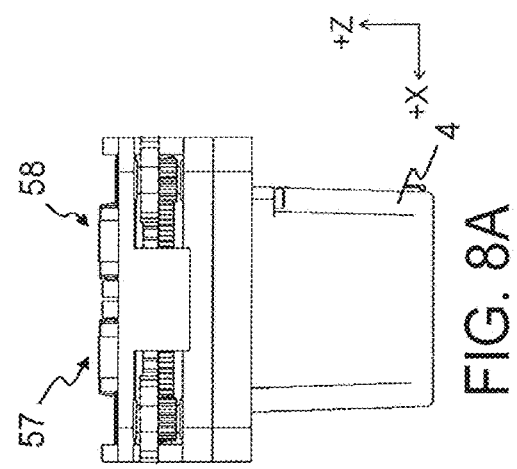
Figure 8D:
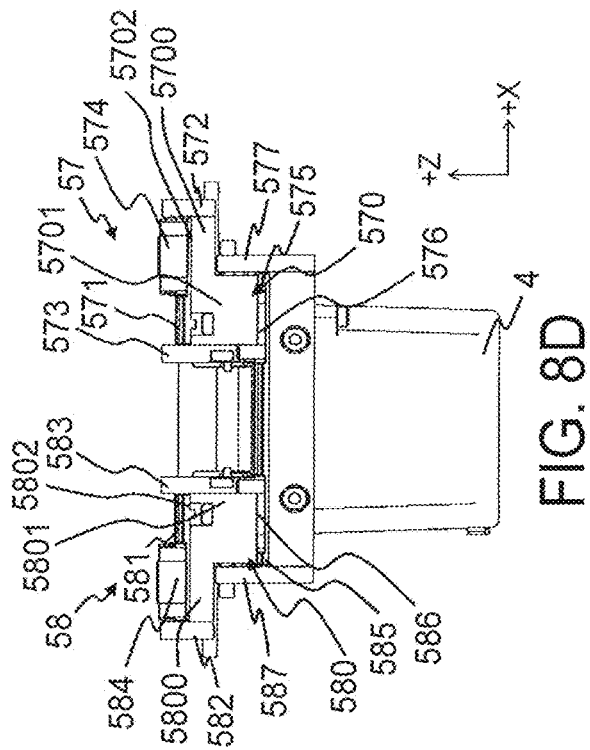
Figure 8C:
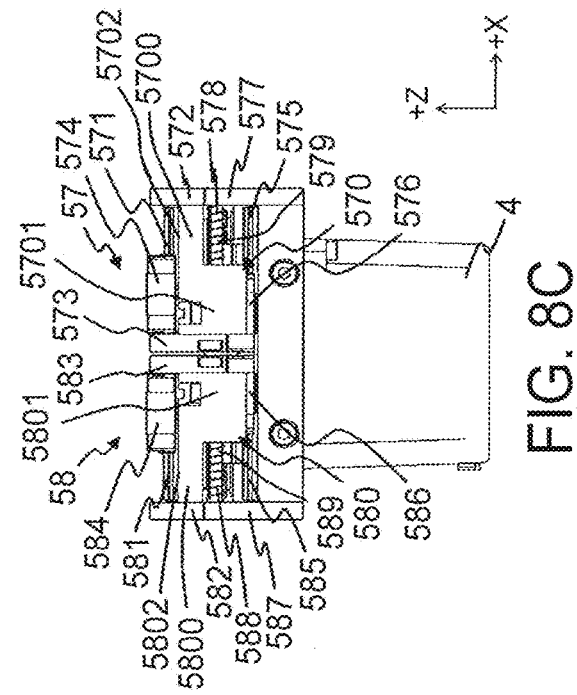

FIGS. 8A to 8D are diagrams illustrating configurations of the third guide 57 and the fourth guide 58. For simplification, the first holding part 2 and the second holding part 3 are omitted. FIGS. 8A and 8B are front views illustrating the base 4 and the moving mechanism 5 in states where the holding mechanism 1 is closed and opened. FIGS. 8C and 8D are back views illustrating the base 4 and the guides of the moving mechanism 5 in states where the holding mechanism 1 is closed and opened.

Figure 9B:
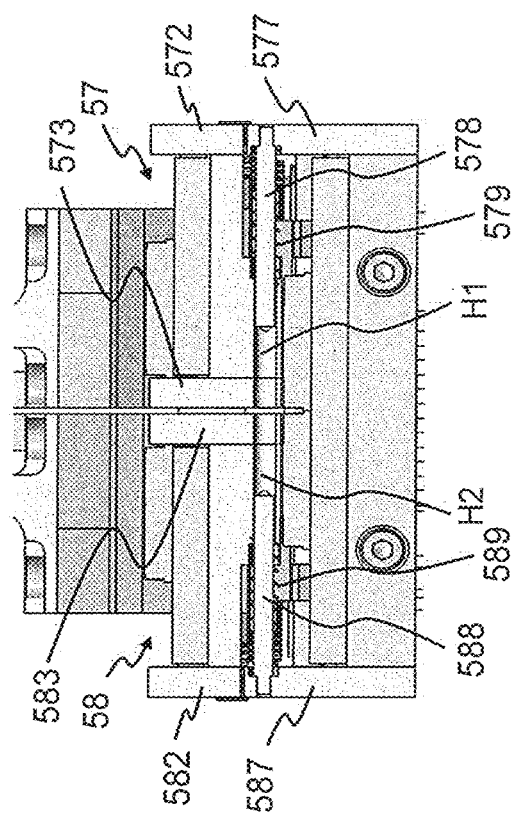
FIGS. 9A and 9B are a side view and a sectional view illustrating configurations of guides of the moving mechanism.
Figure 9A:
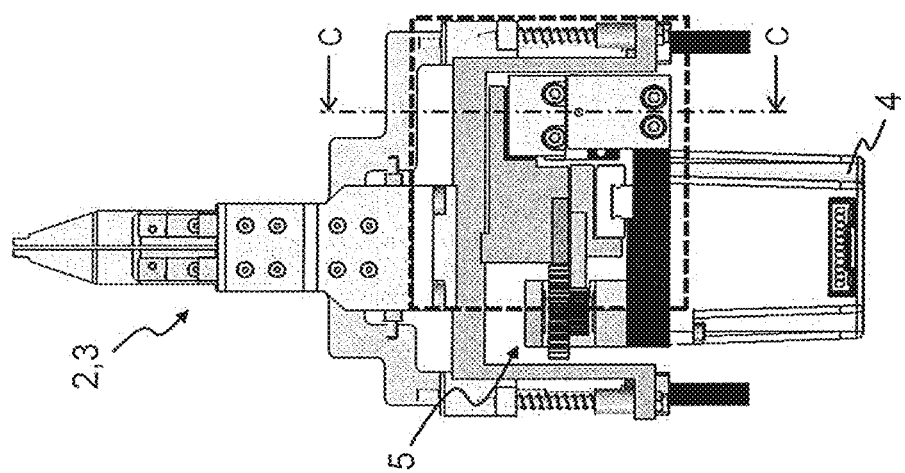

FIGS. 9A and 9B are a side view and a C-C sectional view illustrating configurations of the guides of the moving mechanism 5.

As illustrated in FIGS. 8A to 8D and FIGS. 9A and 9B, the third guide 57 and the fourth guide 58 are positioned at a side surface of the base 4 and are aligned along the X direction. Further, the third guide 57 and the fourth guide 58 have approximately the same height in the Z direction.

The third guide 57 includes a first block 570, a first rail 571, a first side plate 572, a second side plate 573, a first linear guide 574, a second rail 575, a second linear guide 576, a third side plate 577, a first column 578, and a fifth elastic part 579.

The first block 570 includes a first portion 5700 and a second portion 5701. The first portion 5700 is a portion having a thinner thickness than the second portion 5701 with respect to a flat portion 5702. The first portion 5700 and the second portion 5701 have a level difference with different heights as viewed from the −Z direction. In a side surface of the second portion 5701, the side surface being approximately perpendicular to the X axis is provided with a through hole H1 (see FIG. 9B) approximately parallel to the X direction. The first column 578 is brought to pass through the through hole H1. The through hole H1 and the first column 578 are favorably not in contact and provided with a gap.

The first rail 571 is provided on the flat portion 5702 of the first block 570. The direction of the first rail 571 is approximately parallel to the X direction.

The first side plate 572 and the second side plate 573 are arranged on side surfaces perpendicular to the X direction, of the first block 570. To be specific, the first side plate 572 is arranged on a side surface perpendicular to the X direction, of the first portion 5700, and the second side plate 573 is arranged on a side surface perpendicular to the X direction, of the second portion 5701, and intersecting with the flat portion 5702. The first side plate 572 and the second side plate 573 are arranged approximately parallel. Further, the first side plate 572 and the second side plate 573 function as stoppers of the first linear guide 574, and thus favorably protrude from the first rail 571 in the +Z direction. Further, from another perspective, the first side plate 572 and the second side plate 573 are positioned on both ends of the first rail 571. The first side plate 572 and the second side plate 573 may be collectively referred to as first stopper. The first side plate 572 and the second side plate 573 may be integrally formed with the first block 570 and included in the first block 570.

The first linear guide 574 is connected to the first rail 571 and is movable along the first rail 571. The first rail 571 is provided approximately parallel to the X direction, and thus the first linear guide 574 is movable in the X direction along the first rail 571. The first linear guide 574 is provided with a slide guide (not illustrated) for being connected to the first rail 571. The first linear guide 574 is connected with the first moving part 20 of the first holding part 2, and is connected to the third rack 53 through the first moving part 20.

The second rail 575 is positioned in the −Z direction with respect to the first rail 571. Further, the direction of the second rail 575 is approximately parallel to the X direction and is approximately the same direction as the first rail 571. The second rail 575 may include a base for stability. Further, the second rail 575 may be provided on the base 4.

The second linear guide 576 is connected to the second rail 575 and is movable along the second rail 575. The second rail 575 is provided approximately parallel to the X direction, and thus the second linear guide 576 is movable in the X direction along the second rail 575. The second linear guide 576 is provided with a slide guide (not illustrated) for being connected to the second rail 575. The second linear guide 576 is connected with the second portion 5701 of the first block 570, and thus the first block 570 and the second linear guide 576 are movable in the X direction along the second rail 575. The second linear guide 576 may be included in the first block 570. In that case, the second portion 5701 of the first block 570 is provided with the slide guide (not illustrated) for being connected to the second rail 575.

The third side plate 577 is arranged on a side surface of the second rail 575, the side surface being perpendicular to the X direction. That is, the third side plate 577 is arranged approximately parallel to the second side plate 573. From another perspective, the third side plate 577 is positioned on an end of the second rail 575. Further, the third side plate 577 functions as a stopper of the first block 570 and the second linear guide 576, and thus protrudes from the second rail 575 in the +Z direction. For example, when the first block 570 is moved on the second rail 575 in the +X direction, a side surface of the second portion 5701 of the first block 570 comes in contact with the third side plate 577 and the first block 570 stands still. At this time, as illustrated in FIG. 8D, the holding mechanism 1 becomes in the opened state.

The first column 578 is arranged to connect the second side plate 573 and the third side plate 577. As described above, the first column 578 is installed into (between) the second side plate 573 and the third side plate 577, passing through the through hole H1 provided in the second portion 5701. The first column 578 is not limited to installation into both the second side plate 573 and the third side plate 577. The first column 578 may not be installed into the second side plate 573 as long as the first column 578 is installed into the third side plate 577 and gets in the through hole H1 (see FIG. 9B). The first column 578 functions as a guide of the fifth elastic part 579.

The fifth elastic part 579 is arranged between a side surface of the second portion 5701 (the side surface being approximately perpendicular to the X direction) and the third side plate 577, and applies elastic force to between the second portion 5701 and the third side plate 577. The fifth elastic part 579 may be a spring arranged and wound around the first column 578, for example. Alternatively, the fifth elastic part 579 may be any member other than the spring as long as the member can apply the elastic force. With the fifth elastic part 579, the first block 570 is biased to a predetermined position in the −X direction. For example, the second rail 575 may be provided with a stopper (not illustrated) that stops movement of the second linear guide 576 in the −X direction, and the first block 570 may be biased at the stopper position by the elastic force of the fifth elastic part 579. The stopper and the third side plate 577 may be collectively referred to as second stopper.

The fourth guide 58 has an approximately symmetrical configuration to the third guide 57 with respect to a surface perpendicular to the X direction.

The fourth guide 58 includes a second block 580, a third rail 581, a fourth side plate 582, a fifth side plate 583, a third linear guide 584, a fourth rail 585, a fourth linear guide 586, a sixth side plate 587, a second column 588, and a sixth elastic part 589.

The second block 580 includes a first portion 5800 and a second portion 5801. The first portion 5800 is a portion having a thinner thickness than the second portion 5801 with respect to the flat portion 5802. The first portion 5800 and the second portion 5801 have a level difference with different heights as viewed from the −Z direction. In a side surface of the second portion 5801, the side surface being approximately perpendicular to the X axis is provided with a through hole H2 (see FIG. 9B) in a direction approximately parallel to the X direction. The second column 588 is brought to pass through the through hole H2. The through hole H2 and the second column 588 are favorably not in contact and provided with a gap.

The third rail 581 is provided on a flat portion 5802 of the second block 580. The direction of the third rail 581 is approximately parallel to the X direction.

The fourth side plate 582 and the fifth side plate 583 are arranged on side surfaces of the second block 580, the side surfaces being perpendicular to the X direction. To be specific, the fourth side plate 582 is arranged on a side surface perpendicular to the X direction, of the first portion 5800, and the fifth side plate 583 is arranged on a side surface perpendicular to the X direction, of the second portion 5801, and intersecting with the flat portion 5802. The fourth side plate 582 and the fifth side plate 583 are arranged approximately parallel. Further, the fourth side plate 582 and the fifth side plate 583 function as a stopper of the third linear guide 584, and thus favorably protrude from the third rail 581 in the +Z direction. From another perspective, the fourth side plate 582 and the fifth side plate 583 are positioned on both ends of the third rail 581. The fourth side plate 582 and the fifth side plate 583 may be collectively referred to as third stopper. The fourth side plate 582 and the fifth side plate 583 may be integrally formed with the second block 580 and included in the second block 580.

The third linear guide 584 is connected to the third rail 581 and is movable along the third rail 581. The third linear guide 584 is provided with a slide guide (not illustrated) for being connected to the third rail 581. The third linear guide 584 is connected with the second moving part 30 of the second holding part 3, and is connected to the fourth rack 54 through the second moving part 30.

The fourth rail 585 is positioned in the −Z direction with respect to the third rail 581. Further, the direction of the fourth rail 585 is approximately parallel to the X direction and is approximately the same as the direction of the third rail 581. The fourth rail 585 may include a base for stability. Further, the fourth rail 585 may be provided on the base 4.

The fourth linear guide 586 is connected to the fourth rail 585 and is movable along the fourth rail 585. The fourth linear guide 586 is provided with a slide guide (not illustrated) for being connected to the fourth rail 585. The fourth linear guide 586 is connected with the second portion 5801 of the second block 580. Therefore, the second block 580 and the fourth linear guide 586 are movable in the X direction along the fourth rail 585. The fourth linear guide 586 may be included in the second block 580. In that case, the second portion 5801 of the second block 580 is provided with a slide guide (not illustrated) connected to the fourth rail 585.

The sixth side plate 587 is arranged on a side surface of the fourth rail 585, the side surface being perpendicular to the X direction. That is, the sixth side plate 587 is arranged approximately parallel to the fifth side plate 583. Further, the sixth side plate 587 functions as a stopper of the second block 580 and the fourth linear guide 586, and thus protrudes from the fourth rail 585 in the +Z direction. For example, when the second block 580 is moved on the fourth rail 585 in the −X direction, a side surface of the second portion 5801 of the second block 580 comes in contact with the sixth side plate 587, and thus the second block 580 stands still.

The second column 588 is arranged to connect the fifth side plate 583 and the sixth side plate 587. As described above, the second column 588 is installed into (between) the fifth side plate 583 and the sixth side plate 587, passing through the through hole H2 provided in the second portion 5801. The second column 588 is not limited to installation into both the fifth side plate 583 and the sixth side plate 587. The second column 588 may not be installed into the fifth side plate 583 as long as the second column 588 is installed into the sixth side plate 587 and gets in the through hole H2 (see FIG. 9B).

The sixth elastic part 589 is arranged between a side surface of the second portion 5801 (the side surface being approximately perpendicular to the X direction) and the sixth side plate 587, and applies elastic force to between the second portion 5801 and the sixth side plate 587. The sixth elastic part 589 may be, for example, a spring arranged and wound around the second column 588. Alternatively, the sixth elastic part 589 may be any member other than the spring as long as the member can apply the elastic force. With the sixth elastic part 589, the second block 580 is biased to a predetermined position in the +X direction. For example, the fourth rail 585 may be provided with a stopper (not illustrated) that stops movement of the fourth linear guide 586 in the +X direction, and the second block 580 may be biased at the stopper position by the elastic force of the sixth elastic part 589. The stopper and the sixth side plate 587 may be collectively referred to as fourth stopper.

Further, the second rail 575 of the third guide 57 and the fourth rail 585 of the fourth guide 58 may be integrally molded with the same member. In this case, the second side plate 573 installed on the side surface of the first block 570 and the fifth side plate 583 installed on the side surface of the second block 580 come in contact near the center of the rail, and are biased by the elastic force of the fifth elastic part 579 and the sixth elastic part 589 without the stopper on the rail. Alternatively, the second linear guide 576 and the fourth linear guide 586 come in contact near the center of the rail, and are biased. The width of the third guide 57 and the fourth guide 58 in the X direction is approximately the same width of the base 4 in the state where the holding mechanism 1 is closed (see FIG. 8C). The first block 570 (second portion 5701) of the third guide 57 and the first side plate 572 protrude from a side surface of the base 4, the side surface being approximately perpendicular to the X direction in the state where the holding mechanism 1 is opened (see FIG. 8D). Further, the second block 580 (second portion 5801) of the fourth guide 58 and the fourth side plate 582 protrude from a side surface of the base 4, the side surface being approximately perpendicular to the −X direction.

Next, an example of an operation of the moving mechanism 5 will be described. Here, a series of operations from the closed state to the opened state of the holding mechanism 1 will be described.

In the state where the holding mechanism 1 is closed, the first rack 50 and the second rack 51, the third rack 53 and the fourth rack 54, and the third guide 57 and the fourth guide 58 are in approximately contact with each other, respectively, in the moving mechanism 5 (see FIG. 3A, FIG. 5A, FIGS. 7A and 7C, and FIGS. 8A and 8C). Next, when the drive part 52 is driven, the first rack 50 and the second rack 51 are moved in a direction away from each other along the X direction. With the driving of the first rack 50, the gear wheel 550 meshed with the first rack 50 is counter-clockwisely rotated (in a CCW direction). Further, with the driving of the second rack 51, the gear wheel 560 meshed with the second rack 51 is clockwisely rotated (in a CW direction). With the rotation, the gear wheels 551 and 561 are rotated, and the third rack 53 meshed with the gear wheel 551 and the fourth rack 54 meshed with the gear wheel 561 are moved in a direction away from each other in the X direction. With the movement, the first holding part 2 and the second holding part 3 are moved in a direction away from each other.

With the driving of the third rack 53 and the fourth rack 54, the first linear guide 574 coming in contact with the second side plate 573 of the third guide 57 and connected to the third rack 53 through the first holding part 2, and the third linear guide 584 coming in contact with the fifth side plate 583 of the fourth guide 58 and connected to the fourth rack 54 through the second holding part 3, are moved in a direction away from each other.

The first linear guide 574 comes in contact with the first side plate 572. The third linear guide 584 comes in contact with the fourth side plate 582.

Further, the first linear guide 574 provides drive force in the +X direction to the first block 570 and the first side plate 572 (including the second side plate 573) in the state of coming in contact with the first side plate 572. When this drive force becomes larger than the elastic force of the fifth elastic part 579, the first block 570 is moved in the +X direction. Then, the second portion 5701 of the first block 570 being moved in the +X direction comes in contact with the third side plate 577 and is stopped.

Similarly, the third linear guide 584 provides drive force in the −X direction to the second block 580 and the fourth side plate 582 (including the fifth side plate 583) in the state of coming in contact with the fourth side plate 582. When this drive force becomes larger than the elastic force of the sixth elastic part 589, the second block 580 is moved in the −X direction. Then, the second portion 5801 of the second block 580 being moved in the −X direction comes in contact with the sixth side plate 587 and is stopped (see FIG. 3B, FIG. 5B, FIGS. 7B and 7D, and FIGS. 8B and 8D). At this time, the holding mechanism 1 becomes in the most opened state. The most opened state indicates a state in which the first holding part 2 and the second holding part 3 are most distant. The holding mechanism 1 can hold the object by open and close operations of the first holding part 2 and the second holding part 3 by driving of the moving mechanism 5.

Figure 10:
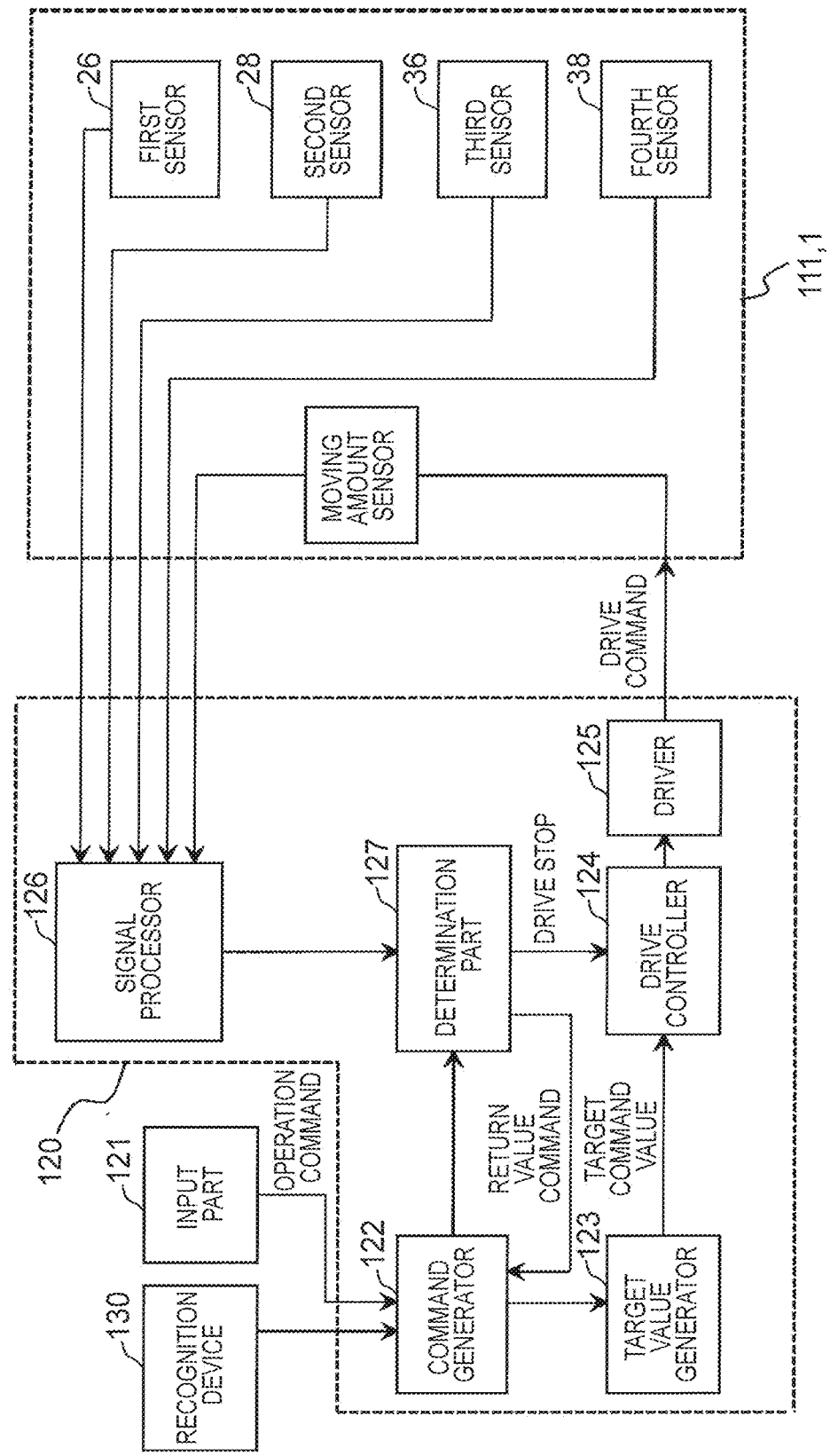
FIG. 10 is a block diagram illustrating relationship between a configuration of a control device, and various sensors and the transfer device.

Next, the control device 120 will be described. FIG. 10 is a block diagram illustrating relationship between a configuration of the control device 120, and the various sensors and the transfer device. The inside of the broken-line frame in FIG. 10 represents the configuration of the control device 120.

The control device 120 includes an input part 121, a command generator 122, a target value generator 123 that generates a target command value, a drive controller 124, a driver 125, a signal processor 126, and a determination part 127.

The input part 121 is a place to which operation command information of the transfer device is input. An input to the input part 121 may be directly performed through a touch panel, a monitor, or the like, or may be performed from a distant place by wireless or wired means. In a case of wireless communication, the input part 121 functions as a communication part. The communication part receives the operation command information from an external computer or a server. Although the wireless communication device is favorable, a communication device may be configured as a communication network. As the communication network, the Internet, an intranet, an extranet, a LAN, an ISDN, a VAN, a CATV communication network, a virtual private network, a telephone network, a mobile communication network, a satellite communication network, or the like is available. A transmission medium that configures the communication network is not especially limited. A wired medium such as IEEE 1394, a USB, a power-line carrier, a cable TV line, a telephone line, or an ADSL line, or a wireless medium such as infrared ray like IrDA or remote control, Bluetooth (registered trademark), 802.11 wireless medium, an HDR, a mobile phone network, a satellite line, or a terrestrial digital network is available. The input part 121 transmits the operation command information to the command generator 122. Alternatively, a microphone can be installed into the input part 121, and the operation command information can be input with a voice of a worker (user). The input part 121 is not indispensable in a case where the handling robot system automatically recognizes the object G and is driven.

The command generator 122 generates operation procedures necessary in operation processes on the basis of the operation command information and a recognition result of the object G in the recognition device 130 described below as an operation command. The command generator 122 generates operation mode information according to the operation command to be executed. The operation command is a command regarding a series of operations of the transfer device 110 and is information as a program, for example. The operation mode information is information regarding an individual operation. For example, the operation mode information is an operation to "open" or "lower" the holding mechanism 1, for example. The command generator 122 includes a storage part that stores the operation mode information and the like. The storage part also stores the shape of the object to be held, attribute data such as a weight and flexibility, and the like in advance. As the storage part, for example, a tape system such as a magnetic tape or a cassette tape, a disk system including a magnetic disk such as floppy (registered trademark) disk/hard disk, or an optical disk such as CD-ROM/MO/MD/DVD/CD-R, a card system such as IC card (including a memory card)/optical card, or a semiconductor memory system such as mask ROM/EPROM/EEPROM/flash ROM, can be used. The command generator 122 outputs the operation command to the target value generator 123. Further, the command generator 122 outputs each operation mode of the operation command in association with actual operation information stored in the storage part to the determination part 127.

The target value generator 123 receives the operation command for the manipulator 111 and the holding mechanism 1 from the command generator 122. The target value generator 123 generates target command values of the manipulator 111 and the holding mechanism 1. The target command values are output to the drive controller 124.

The drive controller 124 receives the target command values of the manipulator 111 and the holding mechanism 1 from the target value generator 123, and generates drive command information for driving the manipulator 111 and the holding mechanism 1 according to the target command values. The drive command information is output to the driver 125.

The driver 125 receives the drive command information of the manipulator 111 and the holding mechanism 1 from the drive controller 124, and generates a drive output. The manipulator 111 and the holding mechanism 1 receive the drive output from the driver 125, and operate an actuator and the like to adjust a drive amount. As the actuator, a combination of a motor and a feed screw, or a pneumatic cylinder can be used, for example.

The signal processor 126 receives signals of various sensors (for example, the first to fourth sensors) by driving the manipulator 111 and the holding mechanism 1, and performs signal amplification processing, analog-digital conversion processing, and the like for the sensor signals.

The determination part 127 receives the sensor signals converted in the signal processor 126. The determination part 127 determines adjustment of opening/closing amounts of the holding mechanism 1, existence/non-existence of inclination of a placing environment, a holding state of the object, and the like according to the sensor signals. The determination part 127 receives the operation information of the manipulator 111 and the holding mechanism 1 corresponding to the operation command from the command generator 122. The determination part 127 compares the operation information with the information by the sensor signals. The determination part 127 generates the operation command such as stop of driving of the manipulator 111 and the holding mechanism 1, posture correction of the manipulator 111 according to the object state, and the like on the basis of the comparison result. The determination part 127 outputs a return value command that corrects the operation command to the command generator 122. The command generator 122 can correct the operation command according to the return value command and can execute a processing operation suitable for the operation command information input in the input part. With this process, reliability and certainty of the operation of the holding mechanism 1 are improved.

The command generator 122, the target value generator 123, the drive controller 124, the signal processor 126, and the determination part 127 include a central processing unit (CPU), a memory, an auxiliary storage, and the like, and execute a program and the like. Furthermore, a part or all of processing may be realized using hardware such as an application specific integrated circuit (ASIC), a programmable logic device (PLD), or a field programmable gate array (FPGA).

Next, the recognition device 130 will be described. As illustrated in FIG. 1, the recognition device 130 recognizes the plurality of objects G placed on the loading area 150.

The recognition device 130 includes a first image sensor 131 to a third image sensor 133, and a calculator 134 connected to the image sensors.

The first image sensor 131 to the third image sensor 133 are positioned diagonally in front, above, and diagonally behind the plurality of objects G placed on the loading area 150, for example. The first image sensor 131 to the third image sensor 133 may be movable. As the first image sensor 131 to the third image sensor 133, a camera capable of measuring three-dimensional positions, such as a distance image sensor or an infrared dot pattern projection camera, can be used. The infrared dot pattern projection camera projects an infrared dot pattern on a target object, and captures an infrared image of the object G placed on the loading area 150 in the projected state. Three-dimensional information of the object G can be obtained by analyzing the infrared image. The infrared dot pattern projection camera may be able to capture a color image or a monochrome image. Alternatively, an optical sensor of a camera that acquires a color image or a monochrome image may be included in addition to the infrared dot pattern projection camera. The image may be typically used image data such as jpg, gif, png, or bmp. The three image sensors have been described. However, an embodiment is not limited thereto, and at least one image sensor may just be included. Further, two or more image sensors may be included.

The calculator 134 derives position information of the object G on the basis of data output from the first image sensor 131 to the third image sensor 133. The three-dimensional position information of the object G is output to the control device 120. The control device 120 controls the transfer device 110 on the basis of the position information of the object G. The calculator 134 includes a CPU, a memory, and an auxiliary storage, for example, and executes a program and the like. Furthermore, a part or all of processing may be realized using hardware such as ASIC, PLD, or FPGA.

Next, the conveyance device 140 will be described. As illustrated in FIG. 1, the conveyance device 140 is a place on which the object G held by the transfer device 110 is placed and conveyed.

The conveyance device 140 includes a conveyor belt 141 in which a plurality of rollers is arranged in a predetermined direction and a belt is wound around the rollers, and a conveyance control device 142. The conveyor belt 141 rotates the plurality of rollers in the predetermined direction to drive the belt and convey the object G. The conveyance control device 142 controls driving of the conveyor belt 141. For example, the conveyance control device 142 controls a conveyance speed and a conveyance direction.

The conveyance device 140 is not limited to the conveyor belt, and includes a roller conveyor and a sorter. The conveyance control device 142 is a computer including a CPU, a memory, and an auxiliary storage, for example. The operation of the conveyance device 140 is automatically controlled by the conveyance control device 142 according to a preset program. However, the worker may manually operate the conveyance control device 142 to control the conveyance device 140.

The loading area 150 is a place on which the object G is loaded or placed. The loading area 150 may be a basket cart, a steel cart, a box pallet, a pallet, a shelf, or the like.

Next, an example of an operation of the handling robot system according to the present embodiment will be described.

Figure 11:
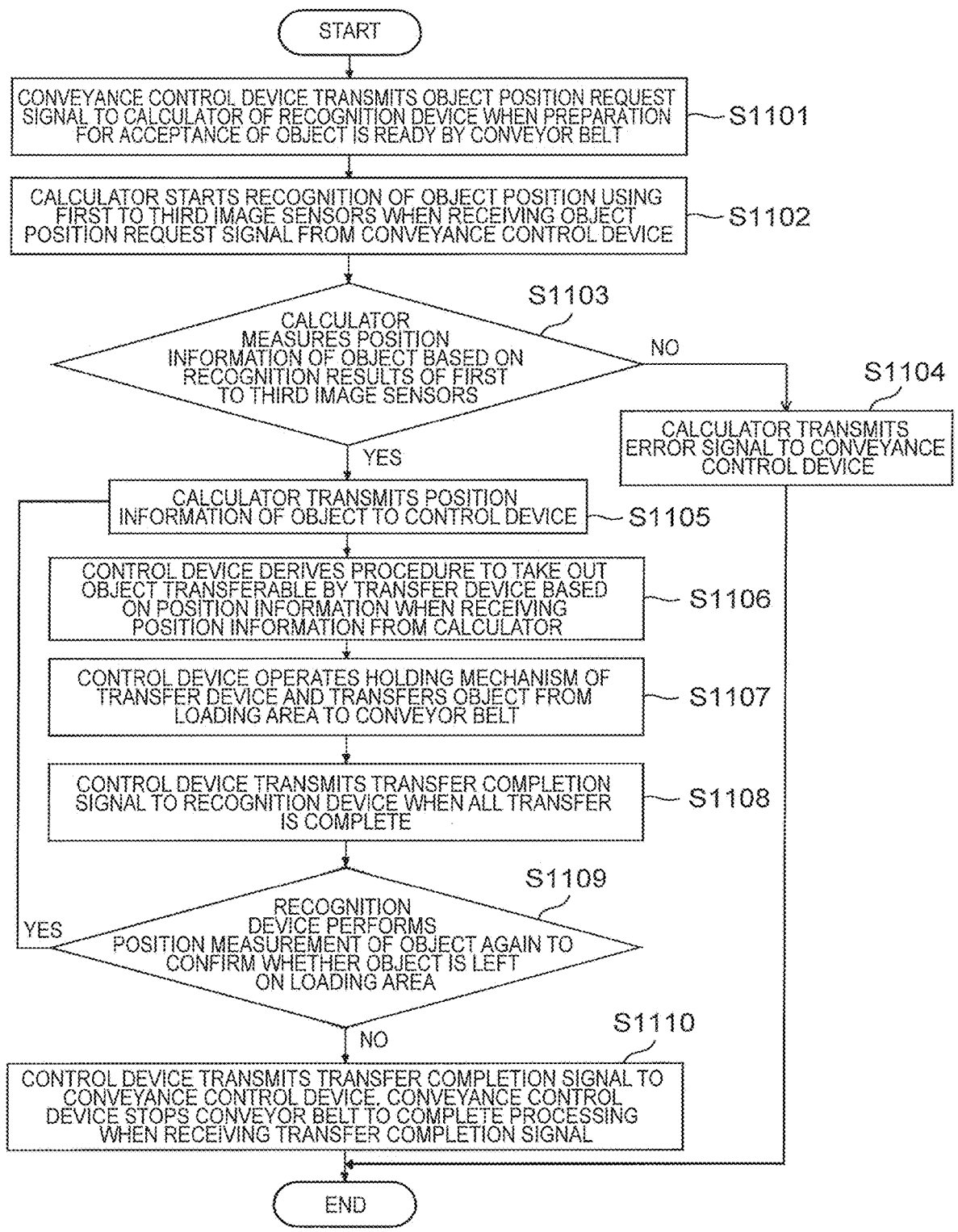
FIG. 11 is a flowchart illustrating an example of an operation of a handling robot system.

FIG. 11 is a flowchart illustrating an example of an operation of the handling robot system.

First, the conveyance control device 142 of the conveyance device 140 transmits an object position request signal to the calculator 134 of the recognition device 130 when preparation for acceptance of the object G is ready by the conveyor belt 141 (step 1101). When receiving the object position request signal from the conveyance control device 142, the calculator 134 starts position recognition of the object G, using the first image sensor 131 to the third image sensor 133 (step 1102). The calculator 134 measures the position information of the object G on the basis of the recognition results of the first image sensor 131 to the third image sensor 133 (step 1103). When no object G is detected (in the case of No), the calculator 134 transmits an error signal to the conveyance control device 142 (step 1104). When the object G is detected (in the case of Yes), the calculator 134 transmits the position information of the object to the control device 120 (step 1105).

When receiving the position information from the calculator 134, the control device 120 derives a procedure to take out the object G transferable by the transfer device 110 on the basis of the position information (step 1106). The control device 120 operates the holding mechanism 1 of the transfer device 110, and transfers the object G from the loading area 150 onto the conveyor belt 141 (step 1107). When the transfer is completed, the control device 120 transmits a transfer completion signal to the recognition device 130 (step 1108). The recognition device 130 performs position measurement of the object G again to confirm whether the object G is left on the loading area 150 (step 1109). When the object G is left (in the case of Yes), the calculator 134 transmits the position information to the control device 120, and the transfer of the object G is performed (returns to step 1105). When the object G is not left (in the case of No), the control device 120 transmits a transfer completion signal to the conveyance control device 142. When receiving the transfer completion signal, the conveyance control device 142 stops the conveyor belt 141 to complete the processing (step 1110). Further, when receiving the transfer completion signal, the conveyance control device 142 may raise an alarm to notify the worker. The worker who has heard the alarm may switch the loading area (for example, a basket cart) from which the objects G are gone to a loading area (for example, a basket cart) on which the objects G are loaded. In the handling robot system of the present embodiment, it is better to transfer the objects G in order from the object G on the top, which can be easily held by the holding mechanism 1, among the plurality of objects G loaded on the loading area 150. The work to switch the basket cart from which the objects G are gone to another basket cart on which the objects G are loaded may be automatically performed using an automatic conveyor that conveys the basket cart.

Next, a holding operation of the holding mechanism 1 will be described in detail.

Here, a holding operation using the first to fourth sensors of the holding mechanism 1 will be described.

FIGS. 12A to 12E are diagrams illustrating an example of a holding operation of the holding mechanism 1. As illustrated in FIG. 12A, an object G1 is horizontally placed on an object G2. When the control device 120 determines that the upper object G1 can be held, the control device 120 drives the transfer device 110. The holding mechanism 1 is lowered by the manipulator 111 on the basis of the recognition result of the recognition device 130. At this time, the holding mechanism 1 is in the closed state. If height information of the object G1 is accurately derived in the recognition device 130, the lowering operation is stopped before the first to fourth holding arms come in contact with an upper surface of the object G1. If the height information of the object G1 is not accurately derived on the basis of the recognition result, the first to fourth holding arms come in contact with the upper surface of the object G1 and are pushed into the −Z direction (displaced). With the operation, the first to fourth sensors are displaced in the −Z direction, and contact with the object G1 thereby is detected. When the contact with the object G1 by the first to fourth holding arms is detected, the control device 120 instantly stops the lowering operation of the holding mechanism 1.

Next, as illustrated in FIG. 12B, the holding mechanism 1 is driven to open the first holding part 2 and the second holding part 3. At this time, the control device 120 controls opening width between the first holding part 2 and the second holding part 3 on the basis of width information of the object G1 from the recognition result of the recognition device 130. Alternatively, the control device 120 may control the opening width between the first holding part 2 and the second holding part 3 by repeating a series of operations to slightly open the first holding part 2 and the second holding part 3 of the holding mechanism 1, lower the holding mechanism 1 by the manipulator 111, raise the holding mechanism 1 by the manipulator 111 when detecting contact with the object G1 by the first to fourth holding arms, further slightly open the first holding part 2 and the second holding part 3, lower the holding mechanism 1 by the manipulator 111, and detect the contact with the object G1 by the first to fourth holding arms. To be specific, when the contact with the object G1 is performed while the opening width of the holding mechanism 1 is gradually made large, one of the first holding part 2 and the second holding part 3 becomes in non-contact with the object G1. The position of the holding part, of which the contact becomes undetected, is stored, and the opening width is further made large. The position of the other holding part, of which the contact becomes undetected when the other holding part becomes in non-contact with the object G1, is further stored. A difference between the positions where the contact with the object G1 by the first holding part 2 and the second holding part 3 becomes undetected is a rough width of the object G. Further, a central position of the position where the contact with the object G by the first holding part 2 and the second holding part 3 becomes undetected is a rough central position of the object G. The control device 120 may just perform control to open the holding mechanism 1 on the basis of the width and the central position of the sensed object G1.

From another perspective, the control device 120 may detect a surface shape while poking or tracing the surface of the object al with the first to fourth holding arms in the state where the holding mechanism 1 is closed. In this case, the position of a state where the first to fourth holding arms are displaced on the surface of the object G1 to the position of a state where the displacement becomes 0 are stored, and the width and the central position of the object G1 may be derived.

Next, as illustrated in FIG. 12C, the holding mechanism 1 in a state of being opened to the width of the object G1 is lowered. If the height information of the object G2 is accurately derived on the basis of the recognition result, the lowering operation of the first to fourth holding arms is stopped before the first to fourth holding arms come in contact with an upper surface of the object G2. When the height information of the object G2 is not accurately derived on the basis of the recognition result, the first to fourth holding arms come in contact with the upper surface of the object G2 and are pushed into the −Z direction (displaced). The first to fourth sensors are displaced into the −Z direction, and contact with the object G2 thereby is detected. When the contact is detected, the control device 120 instantly stops the lowering operation of the holding mechanism 1. After the stop, the holding mechanism 1 is raised by the manipulator 111 until a displacement amount of the first to fourth holding arms becomes undetected.

Next, as illustrated in FIG. 12D, the holding mechanism 1 performs a close operation. At this time, the control device 120 controls a closing width between the first holding part and the second holding part on the basis of the recognition result of the object G1 by the recognition device 130. Alternatively, when the actuator of the drive parts is motor-driven, the control device 120 may detect an overload current and stop the operation when the first holding part and the second holding part clamps the object G1. Alternatively, a pressure sensor made of pressure sensitive rubber or a switch for detecting contact may be arranged on surfaces of the first to fourth holding arms. Alternatively, success or failure of holding may be determined by recognition of the holding state by the recognition device 130.

Next, as illustrated in FIG. 12E, the holding mechanism 1 is raised by the manipulator 111 in a state of clamping the object G1, and the object G1 is transferred to the conveyance device 140.

For example, when contact with the object G1 by one of the first holding part and the second holding part is detected at the operation illustrated in FIG. 12B, the holding mechanism 1 may be moved in the direction of the holding part of which the contact has been detected by the manipulator 111, and position correction may be performed. When the surface of the object G1 is curved in a larger manner than the detection range of the first to fourth sensors, the holding mechanism 1 may be moved up and down by the manipulator 111 to have the surface of the object G1 to fall within the detection range of the first to fourth sensors so that the first to fourth holding arms are moved to trace the curved surface. In this way, the control device 120 measures a part of the shape of the object G to estimate the position and the posture of the object G, and moves the holding mechanism 1 to adjust the position to easily hold the object.

Next, a sensing method of the first to fourth holding arms will be described with reference to FIGS. 13A to 13C to FIGS. 15A to 15F.

Figure 13C:
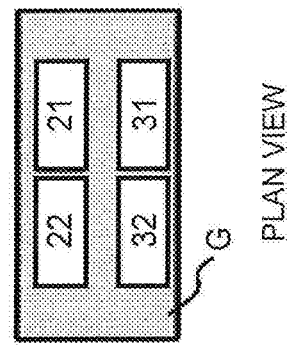
FIGS. 13A to 13C are diagrams illustrating a state in which first to fourth holding arms are in contact with an inclined object.
Figure 13B:
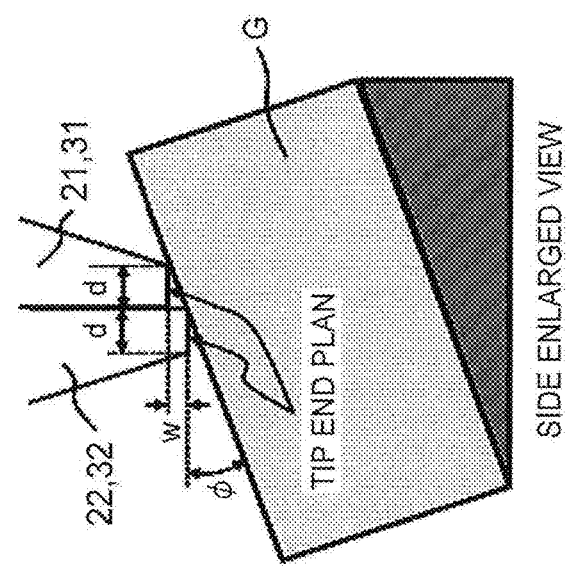
Figure 13A:
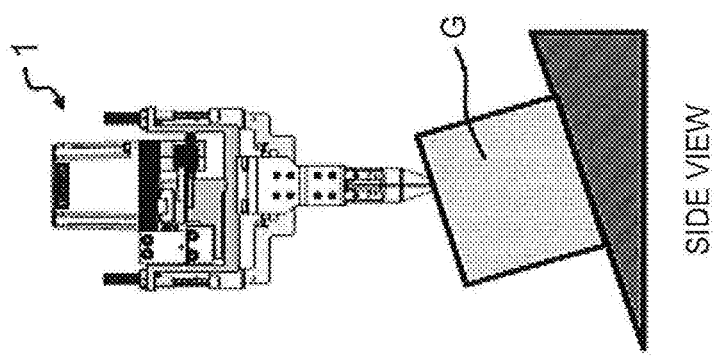

FIGS. 13A to 13C are diagrams illustrating a state in which the first to fourth holding arms are in contact with the inclined object G.

FIG. 13A is a general view of the holding mechanism 1 as viewed from a side direction. FIG. 13B is an enlarged view of a tip end of the holding arms. FIG. 13C is a plan view of a projected tip end plan of the first to fourth holding arms on the object.

As described above, the first to fourth holding arms are movable in the Z direction, and detect the displacement amount by the first to fourth sensors.

As illustrated in FIG. 13B, a relative angle 4 made by the tip end plan of the first to fourth holding arms 21, 22, 31, and 32 and the surface of the object G is expressed by arctan (w/d), where a difference in the displacement amount between the first holding arm 21 and the second holding arm 22 (or a difference in the displacement amount between the third holding arm 31 and the fourth holding arm 32) is w, and the width of the tip end plan is d. Furthermore, combinations of the holding arms for deriving the relative angle 4 include a difference between the first holding arm 21 and the second holding arm 22, a difference between the third holding arm 31 and the fourth holding arm 32, a difference between the first holding arm 21 and the third holding arm 31, and a difference between the second holding arm 22 and the fourth holding arm 32. The relative angle θ may be derived using the difference of any one set of the holding arms. Further, the difference of a plurality of sets of the holding arms may be used. Examples of a method of selecting the holding arms for deriving the relative angle 4 include a method of selecting a set of the holding arms having a large difference, a method of selecting a set of the holding arms having a small difference, a method of selecting a set of the holding arms including a holding arm having a large displacement amount in the −Z direction, and a method of selecting an average of the sets. The method of selecting a set of holding arms including the holding arm having the largest displacement amount in the −Z direction may minimize an error of the relative angle θ. Further, when a rough shape of the upper surface of the object G is known from the recognition result of the recognition device 130, the inclination of the upper surface can be three-dimensionally estimated by bringing the first to fourth holding arms to come in contact with vicinities of corner portions of the upper surface of the object G, respectively.

Figure 14:
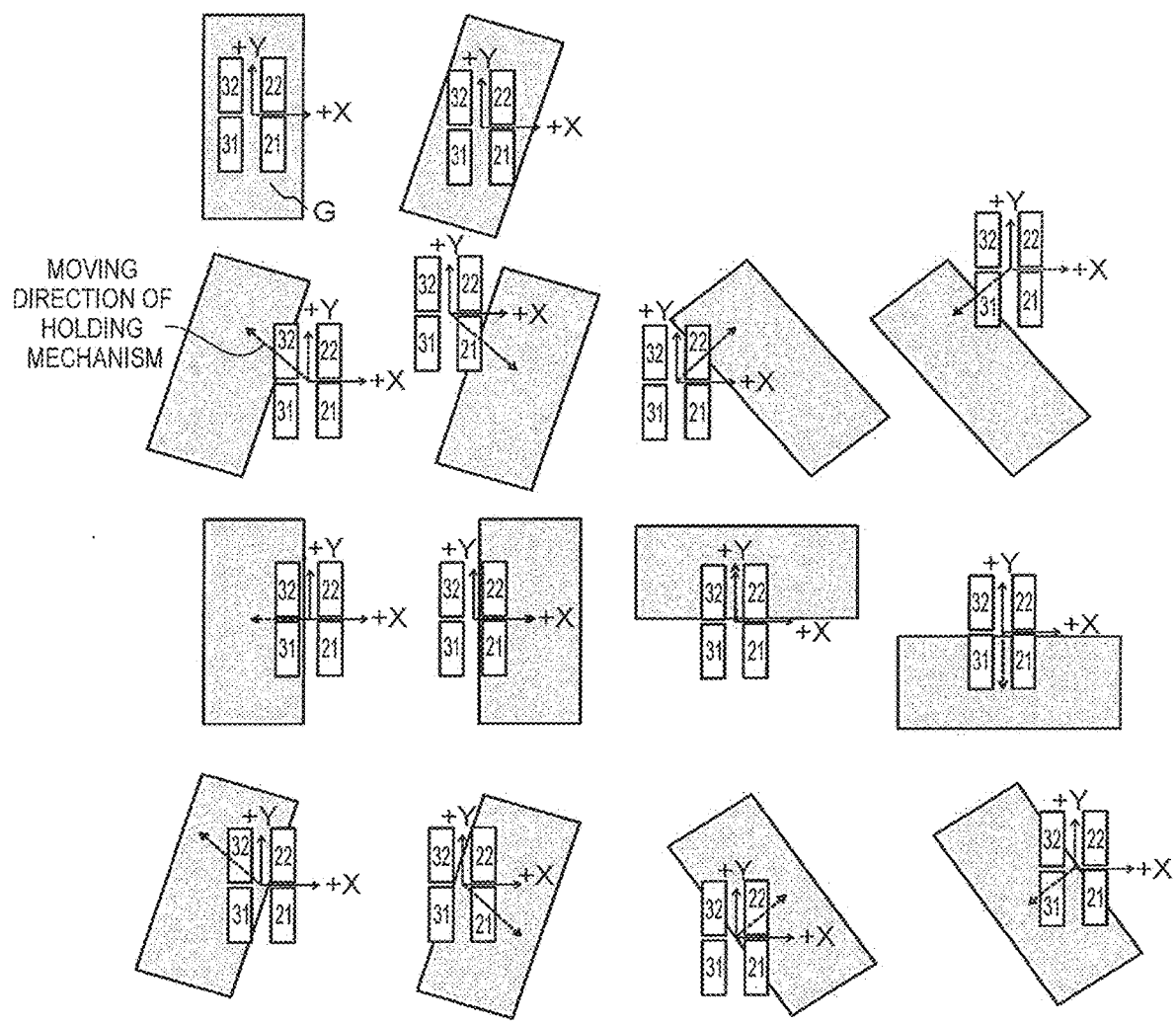
FIG. 14 is a plan view illustrating a method of determining a moving direction of the holding mechanism while the first to fourth holding arms poke a surface of a object.

FIG. 14 is a plan view illustrating a method of determining the moving direction of the holding mechanism 1 while poking the surface of the object G by the first to fourth holding arms. FIG. 14 exhaustively illustrates patters of contact of the first to fourth holding arms 21, 22, 31, and 32. In FIG. 14, when the first to fourth holding arms come in contact with the upper surface of the object G, a moving direction of the holding mechanism 1 to get close to the object G is estimated from the position of the sensor that has detected displacement. The broken arrows in FIG. 14 are the moving directions of the holding mechanism 1. The manipulator 111 moves the holding mechanism 1 in the direction by a predetermined amount. To be specific, the manipulator 111 moves the holding mechanism 1 in the direction of the holding arm, of which the contact has been detected, by the predetermined amount. After moving the holding mechanism 1 in the direction of the holding arm that has detected the displacement, by the predetermined amount, the manipulator 111 repeats the operation to poke the surface of the object G and move the holding mechanism 1 to the direction of the sensor that has detected the displacement, by the predetermined amount, to get closer to the position of the object G. Further, the moving direction may be determined by not only the detection of the displacement of the first to fourth holding arms but also a combination of the detection of the displacement and the recognition result of the recognition device 130. With the operation, more accurate position detection of the object G becomes possible.

Figure 15C:
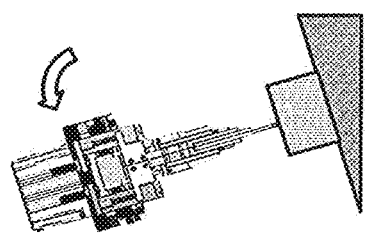
FIGS. 15A to 15F are diagrams illustrating an example of posture correction of the holding mechanism according to an inclination amount of the object.
Figure 15B:
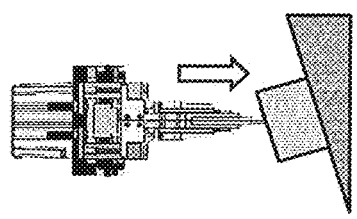
Figure 15A:
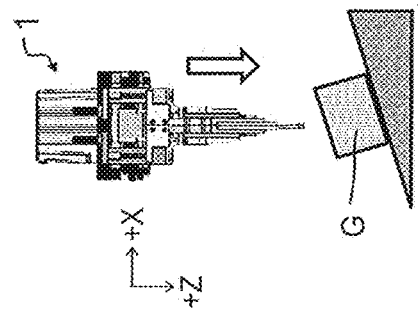
Figure 15F:
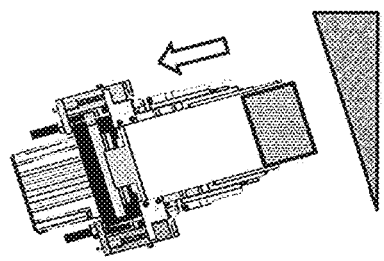
Figure 15E:
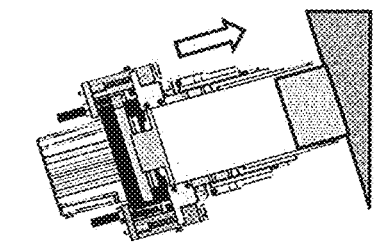
Figure 15D:
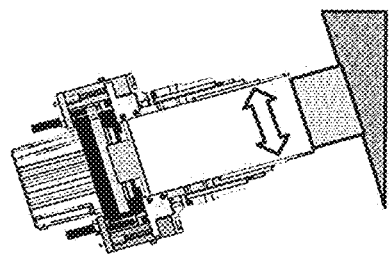

FIGS. 15A to 15F are diagrams illustrating an example of posture correction of the holding mechanism 1 according to an inclination amount of the object G. As illustrated in FIG. 15A, first, the control device 120 lowers the holding mechanism 1. Next, as illustrated in FIG. 15B, the control device 120 stops the lowering of the holding mechanism 1 when detecting contact with the object G by any of the first to fourth holding arms. Next, as illustrated in FIG. 15C, the control device 120 drives the manipulator 111 to incline the holding mechanism 1 in the direction of a non-contact holding arm. At this time, the rotation center is the tip end of the holding arm that is first in contact. When all the first to fourth holding arms are in contact with the object G, the control device 120 stops the inclination operation of the holding mechanism 1 by the manipulator. With the operation, a tip end of the first to fourth holding arms and the upper surface of the object G becomes parallel. Next, as illustrated in FIG. 15D, the control device 120 opens the holding mechanism 1 to the width of the object G or more. For sensing the width of the object G and the central position of the object G, the above-described method may be used. Further, the control device 120 may raise the holding mechanism 1 until the displacement amount of the first to fourth holding arms in the Z direction becomes 0 in the state where the holding mechanism 1 is inclined, and open the holding mechanism 1 up to the width of the object G on the basis of the recognition result of the object G by the recognition device 130. Next, as illustrated in FIG. 15E, the control device 120 lowers the holding mechanism 1 to hold the object G. Next, as illustrated in FIG. 15F, the control device 120 closes the holding mechanism 1 to hold the object G, and transfers the object G to the conveyance device 140.

The inclination measurement of the top surface of the object G can be immediately performed if all the holding arms are right above the object G. However, typically, the holding arms may be shifted from the object G (when only two of the holding arms are in contact with the object G, as illustrated in FIG. 14). In this case, it is better to move the holding mechanism 1 to cause all the holding arms to come in contact with the object G on the basis of the recognition result of the recognition device 130. With the operation, failure to catch the object can be decreased and reliability of holding can be improved. In the above method, the holding mechanism 1 is lowered to come close to the object G and is inclined when contact with the object G by any of the first to fourth holding arms is detected. However, the holding mechanism 1 may be lowered until all the holding arms come in contact. In this case, the control device 120 may derive the inclination of the object from the differences of the displacement amounts of the first to fourth holding arms, and change the posture by rotating the holding mechanism on the basis of the derivation result.

In the above description, sensing a state of the upper surface (+Z direction) of the object G by the first to fourth holding arms has been mainly described. However, sensing of a state of a side surface of the object G, using a similar sensing method, is also possible. Further, the above-sensing methods can be used in combination.

The holding mechanism 1 according to the present embodiment can open the first holding part 2 and the second holding part 3 in the X direction in stages by use of the third guide and the fourth guide in the moving mechanism 5. Further, an increase in the size of the holding mechanism 1 when the first holding part 2 and the second holding part 3 are opened can be prevented. With the configuration, an access to the object G placed in a narrow space becomes possible.

Further, the holding mechanism 1 can be simply configured by use of first and second gear wheels meshed with the first to fourth racks in the moving mechanism 5.

Further, the holding mechanism 1 can increase opening/closing speed and opening/closing amount of the holding parts by use of two gear wheels having different radiuses from each other as the first and second gear wheels.

Further, the holding mechanism 1 has the first to fourth holding arms that are movable in the Z direction, and thus can prevent breakage of the object G when the first to fourth holding arms come in contact with the object G.

Further, the holding mechanism 1 can detect the displacement amount of the first to fourth holding arms in the Z direction by the first to fourth sensors, and thus can accurately detect the height information of the object G, when recognition accuracy of the object G by the recognition device 130 is low.

Further, by use of the sensing with the first to fourth sensors of the holding mechanism 1, tracer control to decrease drive speed of the manipulator can be performed when the first to fourth holding arms come in contact with the object a or the table where the object a is placed.

Further, although the recognition device 130 may not be able to accurately recognize the inclination state of the object G or its placing environment, the inclination state of the object G or its placing environment can be accurately detected by use of the above sensing method by the holding mechanism 1.

Further, by the combination of the recognition device 130 and the sensing of the holding mechanism 1, the object G can be accurately and stably held.

Further, the holding mechanism 1 includes the four sensors including the first to fourth sensors, and thus can accurately detect plan information of the object G and the placing environment.

Each of the third guide 57 and the fourth guide 58 of the holding mechanism 1 according to the present embodiment includes the linear guides movable in the X direction, in two stages in the Z direction. However, the present embodiment is not limited thereto, and the linear guides may be arranged in multi-stages in the Z direction. In this case, the configuration from the first block 570, the first rail 571, the first side plate 572, the second side plate 573, to the first linear guide 574 is put in multi-stages in the Z direction.

The handling robot system according to the present embodiment includes the transfer device 110, the control device 120 and the recognition device 130, and includes a picking device and an inspection device that autonomously moves to the shelf or the like on which the object G is placed, and picks and inspects the object G. Further, the handling robot system equips a luggage carrier in which the object G is put, and includes a pick-out device that picks out the object G from the luggage carrier to the shelf or the like and a carry-in device.

Second Embodiment

Figure 16A:
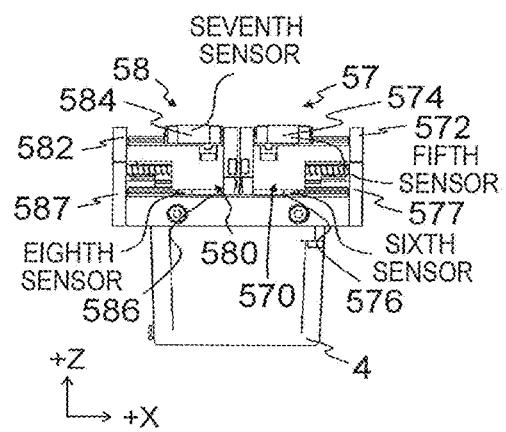
FIGS. 16A and 16B show diagrams illustrating an example of a holding mechanism according to a second embodiment.
Figure 16B:
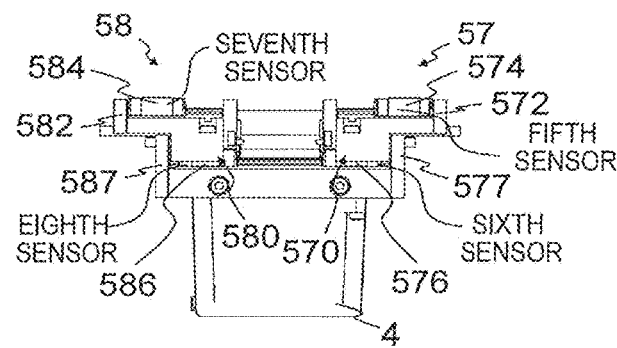

A second embodiment will be described with reference to FIGS. 16A and 16B. FIGS. 16A and 16B show diagrams illustrating an example of a holding mechanism according to the second embodiment. Here, for simplification, a first holding part and a second holding part are omitted.

As illustrated in FIGS. 16A and 16B, in the holding mechanism according to the second embodiment, first to fourth linear guides of a third guide 57 and a fourth guide 58 are respectively provided with fifth to eighth sensors that measure a displacement amount in an X direction. Other configurations are similar to those of the holding mechanism according to the first embodiment.

The fifth to eighth sensors are respectively built in the first to fourth linear guides. Further, the fifth sensor may be arranged between the first linear guide 574 and the first side plate 572. The sixth sensor may be arranged between the second linear guide 576 and the third side plate 577. The seventh sensor may be arranged between the third linear guide 584 and the fourth side plate 582. The eighth sensor may be arranged between the fourth linear guide 586 and the sixth side plate 587. As the fifth to eighth sensors, a linear encoder, an ultrasonic sensor, a variable resistance, a capacitive sensor, a pulse coder, a fiber sensor, a laser displacement sensor, or the like is used, for example. Another sensor that outputs a voltage or a current according to the displacement may be used.

By use of the fifth to eighth sensors, moving amounts of the first holding part 2, the second holding part 3, a first block 570, and a second block 580 can be accurately measured.

Further, opening/closing amounts of the first holding part 2 and the second holding part 3 can be directly measured. Therefore, highly accurate opening/closing control of the holding mechanism 1 can be realized.

Further, the holding mechanism according to the present embodiment has a structure having the linear guides arranged in stages to obtain a large stroke. Therefore, a measurement range per one displacement sensor is small. With the configuration, a reasonable and small displacement sensor can be used.

Third Embodiment

Figure 17A:
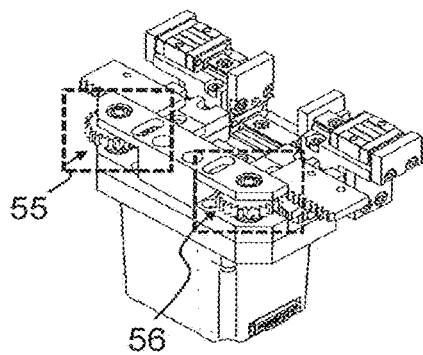
FIGS. 17A and 17B show diagrams illustrating an example of a holding mechanism according to a third embodiment.
Figure 17B:
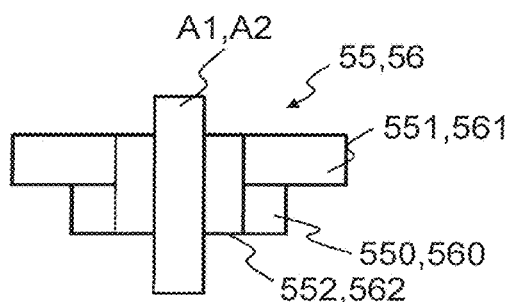

A third embodiment will be described with reference to FIGS. 17A and 17B. FIGS. 17A and 17B show diagrams illustrating an example of a holding mechanism according to the third embodiment.

As illustrated in FIGS. 17A and 17B, a moving mechanism 5 of a holding mechanism according to the third embodiment is provided with an elastic element 552 such as rubber between the first gear wheel 55 and the first shaft A1. Further, an elastic element 562 such as rubber is provided between the second gear wheel 56 and the second shaft A2. Other configurations are similar to those of the holding mechanism according to the first embodiment.

The first gear wheel 55 and the second gear wheel 56 are provided with the elastic elements. Therefore, the elastic elements are deformed when the holding mechanism 1 holds an object G, and acting extra force on the object G can be prevented. Therefore, breakage of the object G and the like can be prevented.

Further, when the holding mechanism 1 holds the object G, safety and reliability of a holding operation can be improved. Further, even if positioning accuracy of a manipulator 111 is low, the holding mechanism 1 can mechanically absorb an error amount with the elastic elements when holding the object G.

Fourth Embodiment

Figure 18:
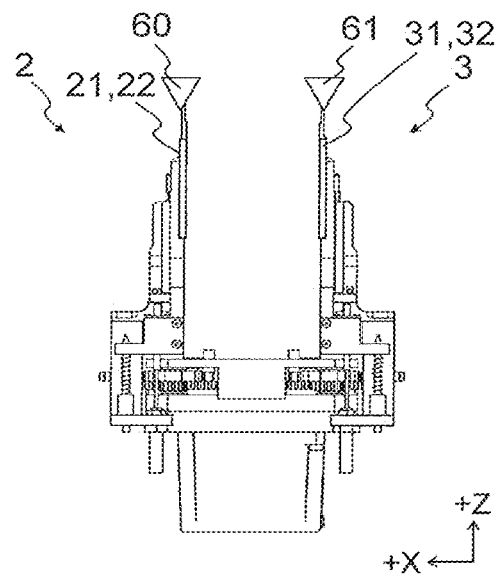
FIG. 18 is a diagram illustrating an example of a holding mechanism according to a fourth embodiment.

A fourth embodiment will be described with reference to FIG. 18. FIG. 18 is a diagram illustrating an example of a holding mechanism according to the fourth embodiment.

As illustrated in FIG. 18, the holding mechanism 1 according to the fourth embodiment includes a first vacuum suction part 60 on tip ends of the first holding arm 21 and the second holding arm 22 of the first holding part 2, a second vacuum suction part 61 on tip ends of the third holding arm 31 and the fourth holding arm 32 of the second holding part 3, and a vacuum pump (not illustrated) that decompresses the first vacuum suction part 60 and the second vacuum suction part 61. Other configurations are similar to those of the holding mechanism according to the first embodiment.

The first vacuum suction part 60 and the second vacuum suction part 61 may be suction pads. The first vacuum suction part 60 and the second vacuum suction part 61 come in contact with an object G to hold the object G by suction. Each of the first vacuum suction part 60 and the second vacuum suction part 61 includes at least one or more suction pads. The first vacuum suction part 60 and the second vacuum suction part 61 are in contact with the vacuum pump through a tube.

The vacuum pump decompresses insides of the first vacuum suction part 60 and the second vacuum suction part 61 in contact with the object G. A configuration to generate a negative pressure by a combination of a pressurizer and a vacuum generator may be employed other than the vacuum pump. Further, a switching valve may be arranged in the middle of the tube that connects the first vacuum suction part 60 and the second vacuum suction part 61 with the vacuum pump, and start and stop of suction may be arbitrarily controlled. The switching valve may be an electromagnetic valve, a valve operated by an electric motor, or a valve operated by air pressure. Further, a pressure generation device such as a compressor may be piped to the switching valve. In this case, the negative pressure and the positive pressure of the first vacuum suction part 60 and the second vacuum suction part 61 can be switched at arbitrary timing by control of the switching valve, and suction and release of the object G can be smoothly performed.

By use of the holding mechanism 1 according to the present embodiment, an object having a limit opening width or more of the first holding part 2 and the second holding part 3 can be held. Therefore, a wide variety of objects can be held.

Fifth Embodiment

Figure 19:
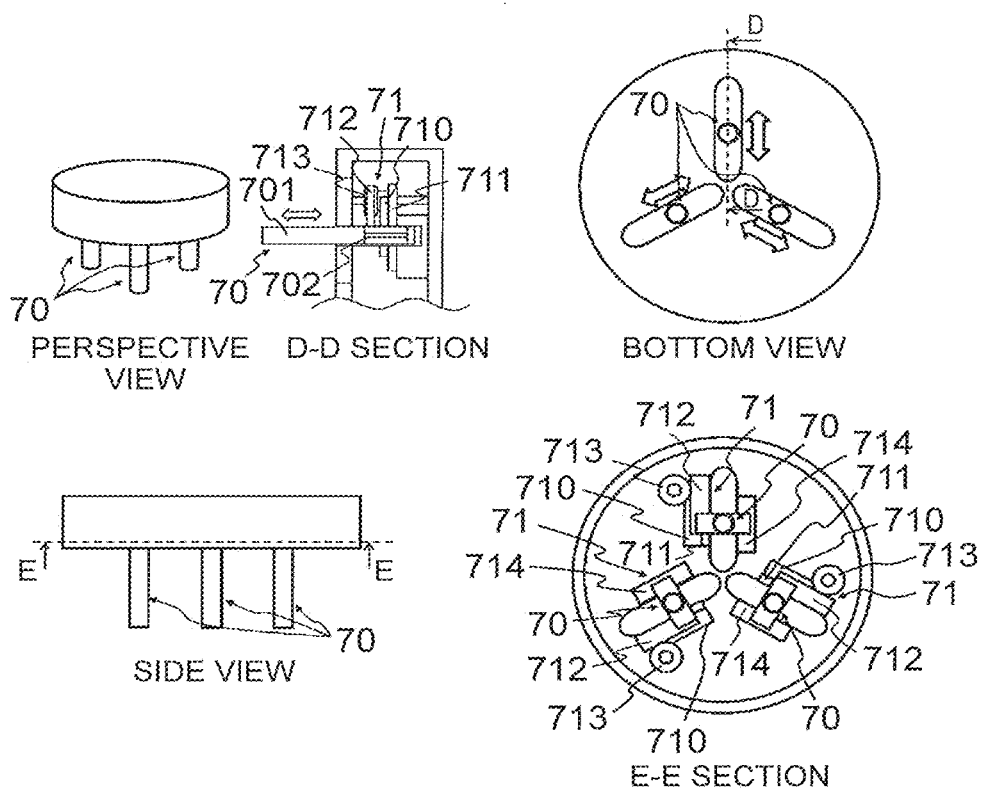
FIG. 19 shows diagrams illustrating an example of a holding mechanism according to a fifth embodiment.

A fifth embodiment will be described with reference to FIG. 19. FIG. 19 shows diagrams illustrating an example of a holding mechanism according to the fifth embodiment.

As illustrated in FIG. 19, the holding mechanism according to the fifth embodiment includes three holding parts 70 and three moving mechanisms 71 respectively connected to the holding parts. Other configurations are similar to those of the holding mechanism according to the first embodiment.

The holding parts 70 are radially arranged to gather to a central position when holding an object G. Further, each of the holding parts 70 is movable in a Z direction. Each of the holding parts 70 is provided with a sensor 701 that detects displacement in the Z direction and can detect displacement of a holding arm 702. Each of the holding parts according to the first embodiment includes two holding arms, which has been described. However, the holding part 70 according to the present embodiment includes one holding arm 702. Further, the shape of the holding arm 702 may be a rod-like shape.

The holding parts 70 are radially movable by moving mechanisms 71 respectively provided thereto. The moving mechanism 71 includes a fifth rack 710, a drive part 711 that drives the fifth rack 710, a sixth rack 712 positioned in a +Z direction with respect to the fifth rack 710, a third gear wheel 713 (also referred to as third gear) meshed with the fifth rack 710 and the sixth rack 712 with gear wheels having different radiuses from each other, and a fifth guide 714. The configuration except for the fifth guide 714, of the configuration of the moving mechanism 71, may be referred to as drive mechanism. To be specific, the configuration according to the present embodiment is similar to the configuration of the moving mechanism that moves the first holding part or the second holding part according to the first embodiment. The moving mechanisms 71 are radially arranged. When the moving mechanisms 71 are driven, the holding parts 70 are radially opened/closed. A case of the three holding parts 70 has been described. However, the number of the holding parts 70 is not limited to three and may be more than three.

The holding mechanism according to the present embodiment can more stably hold the object by including at least the three holding parts 70.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A holding mechanism comprising:
a first holding part;
a second holding part facing the first holding part in a first direction, the first direction being an approximately horizontal direction;
a first guide connected to the first holding part and capable of moving the first holding part in the first direction;
a second guide connected to the second holding part and capable of moving the second holding part in the first direction;
a third guide capable of moving the first guide in the first direction;
a fourth guide capable of moving the second guide in the first direction, and aligned with the third guide in the first direction;
a drive mechanism that changes a distance between the first holding part and the second holding part; and
a control device configured to estimate a shape of an object to be held, wherein
the first holding part and the second holding part are movable in a second direction intersecting with the first direction, the second direction being an approximately vertical direction,
each of the first holding part and the second holding part includes:
a second detector that detects a displacement amount in the second direction, and
an elastic part that applies an elastic force in the second direction,
the second detector is aligned with the elastic part in the second direction, and
the control device estimates the shape of the object based on the displacement amount.

2. The holding mechanism according to claim 1, wherein
the drive mechanism operates the first holding part and the second holding part to poke or trace a surface of the object in the second direction, and
the second detector detects a position where the first holding part and the second folding part contact with the surface of the object in the second direction and detects the displacement amount of the first holding part and the second folding part in the second direction based on the position.

3. The holding mechanism according to claim 1, wherein the control device derives a width and a central position of the object based on the shape of the object.

4. The holding mechanism according to claim 3, wherein the drive mechanism operates the first holding part and the second holding part to hold the object based on the width and the central position of the object.

\* \* \* \* \*